United States Patent [19]

Iesaka et al.

[11] Patent Number: 5,796,432
[45] Date of Patent: Aug. 18, 1998

[54] METHOD OF AND APPARATUS FOR SOLID STATE IMAGING DEVICE

[75] Inventors: Mamoru Iesaka; Tetsuro Kumesawa, both of Kanagawa, Japan

[73] Assignee: Sony Corporation, Japan

[21] Appl. No.: 591,948

[22] Filed: Jan. 23, 1996

Related U.S. Application Data

[63] Continuation of Ser. No. 229,801, Apr. 19, 1994, abandoned.

[30] Foreign Application Priority Data

Apr. 20, 1993 [JP] Japan ................... 5-116375
Jun. 1, 1993 [JP] Japan ................... 5-130749

[51] Int. Cl.$^6$ ........................... H04N 5/335
[52] U.S. Cl. ................. 348/311; 348/314; 257/223
[58] Field of Search ................. 348/311, 314, 348/320, 220, 241, 248, 249, 250, 319, 321, 317; 257/229, 230, 231, 232, 233, 242, 247, 223, 246; 327/515; 377/58, 60

[56] References Cited

U.S. PATENT DOCUMENTS 4,168,444  9/1979  van Santen ................... 327/515
4,875,101  10/1989  Endo et al. ................... 348/314
5,182,623  1/1993  Hynecek ................... 257/230

FOREIGN PATENT DOCUMENTS 0127363  12/1984  European Pat. Off. ........ H01L 27/14
0357932  3/1990  European Pat. Off. ........ H04N 5/217
0444696  9/1991  European Pat. Off. ........ H04N 5/335

OTHER PUBLICATIONS

EPO Search Report.

*Primary Examiner*—Andrew Faile
*Assistant Examiner*—Andrew B. Christensen
*Attorney, Agent, or Firm*—Ronald P. Kananen

[57] ABSTRACT

A solid state imaging device and method of operating the same includes an imaging section for converting incident light into a signal charge which is temporarily stored in a storage section before being read out. A vertical transfer register extends from an imaging section to a storage section. A transfer clock pulse is applied to a portion of the vertical transfer register disposed in the storage section such that the potential of the vertical transfer register in the storage section is deeper than that in the imaging section. Excess charge is transferred to a smear drain section. According to an alternate feature, the potential of the vertical transfer register within either the imaging section or the storage section is maintained constant. A further feature makes use of two drain regions disposed at respective distal ends of the imaging section and the storage section.

17 Claims, 19 Drawing Sheets

FIG.10

|  | Imaging Section | Accumulation Section |
|---|---|---|
| Frame Shift Transfer | ~1 | ~1 |
| Line Shift Transfer | ~1 | ~1 |
| Excess Electric Charge Discharge and Transfer | ~1 | ~0 |

FIG.13

|  | Imaging Section | Accumulation Section |
|---|---|---|
| Frame Shift Transfer | ~1 | ~1 |
| Line Shift Transfer | ~0 | ~1 |
| Excess Electric Charge Discharge and Transfer | ~1 | ~0 |

METHOD OF AND APPARATUS FOR SOLID STATE IMAGING DEVICE

This application is a continuation of application Ser. No. 08/229,801 filed Apr. 19, 1994 now abandoned.

BACKGROUND OF THE INVENTION

1. Field of the Invention

The present invention relates to solid state imaging devices and, more particularly, to an FIT (frame interline transfer) type solid state imaging device in which signal charges read out from a sensor section are transferred by a vertical register to a storage section and temporarily stored therein and to a driving method thereof.

2. Description of the Prior Art

Heretofore, FIT (frame interline transfer) type solid state imaging devices were also known as a CCD (charge-coupled device) solid state imaging devices. FIG. 1 of the accompanying drawings shows an overall arrangement of a typical FIT type CCD solid state imaging device 1. FIG. 2 is a timing chart of clock pulses for driving the CCD solid state imaging device 1 and a vertical blanking pulse $\phi$V-BLK in which only vertical transfer clock pulses $\phi IM_1$, $\phi ST_1$ for driving the imaging section 4 and vertical transfer registers 3, 5 of the storage section 6 are illustrated as the clock pulse. Other vertical transfer clock pulses, such as $\phi IM_2$, $\phi IM_3$, $\phi IM_4$, $\phi ST_2$, $\phi ST_3$, $\phi ST_4$ of FIG. 1, are substantially similar to the vertical transfer clock pulses $\phi IM_1$, $\phi ST_1$ described above and therefore need not be further described.

As shown in FIG. 1, the FIT type CCD solid state imaging device 1 includes an imaging section 4 formed of a number of sensor sections 2 which serve pixels arranged in a two-dimensional fashion, and vertical transfer registers 3, having CCD structures, which are provided on one side of each sensor section column, a storage section 6 formed of a plurality of vertical transfer register 5 having CCD structures, which are responsive to the vertical transfer registers 3 of the imaging section 4, a horizontal transfer register 7 having a CCD structure, a drain region 8 provided on the opposite side of the storage section 6 from the horizontal transfer register 7 through a gate section 10 for discharging excess electric charges, and a signal charge detecting section 9 connected to the final stage of the horizontal transfer register 7.

The vertical transfer registers 3 in the imaging section 4 are driven by 4-phase vertical transfer clock pulses $\phi IM_1$, $\phi IM_2$, $\phi IM_3$, $\phi IM_4$, and the vertical transfer register 5 in the storage section 6 are driven by 4-phase vertical transfer clock pulses $\phi ST_1$, $\phi ST_2$, $\phi ST_3$, $\phi ST_4$. Further, the horizontal transfer register 7 is driven by 2-phase horizontal transfer clock pulses $\phi H_1$, $\phi H_2$.

A clock pulse $\phi_D$ is applied to the gate section 10 and a DC voltage $V_D$ is applied to the drain region 8.

A read-out operation of the FIT type CCD solid state imaging device 1 is carried out as follows. Initially, during a vertical blanking period 11, signal charges photoelectrically-converted by the respective sensor sections 2 are read out from the sensor sections 2 to the vertical transfer registers 3. The signal charges are then transferred from the vertical transfer registers 3 in the imaging section 4 to the vertical transfer registers 5 in response to a frame shift transfer pulse 13. Signal charges of every horizontal line is transferred from the vertical transfer registers 5 to the horizontal transfer register 7 in response to a line shift transfer pulse 14, whereafter the signal charges are transferred within the horizontal transfer register 7 in response to the 2-phase transfer clock pulses $\phi H_1$, $\phi H_2$ and then output from the signal charge detecting section 9.

Thereafter, excess electric charges remaining in the vertical transfer registers 3 in the imaging section 4 are discharged to the storage section 6 in response to an excess electric charge discharging and transferring pulse 15. The excess electric charges are discharged from the storage section 6 to the drain region 8 through the gate section 10.

Then, signal charges are again read out from the sensor sections 2 in response to a read-out pulse 12. The above-mentioned operation will be repeated and the read-out operation of the FIT type CCD solid state imaging device 1 is carried out.

The FIT type CCD solid state imaging device 1 needs a frame shift transfer operation and an excess electric charge discharging and transferring operation as compared with the normal IT (interline transfer) type CCD solid state imaging device.

Therefore, the FIT type CCD solid state imaging device 1 consumes about three times as much power as the IT type CCD solid state imaging device in order to drive the vertical transfer registers 3, 5.

Moreover, since it is customary that the FIT type CCD solid state imaging device 1 is used in a camera having a large optical system (1-inch or ⅔-inch) to obtain a high picture quality, as compared with the IT type CCD solid state imaging device, the chip area of the FIT type CCD solid state imaging device 1 is increased. As a consequence, power consumption of the FIT type CCD solid state imaging device 1 tends to increase.

The increase in power consumption is not an easy problem to solve because the temperature of the CCD imaging device rises when the power consumption is increased. Therefore, the rise of temperature should be suppressed. There is then the problem that the camera portion of the CCD solid state imaging device cannot easily be miniaturized.

These problems become serious particularly when a large camera, such as an HDTV (high definition television) receiver, is used for ENG (electric new gathering).

Further, it is known that electric charges are generated when a charge-coupled device forming a charge transfer section senses light and that electric charges cause a false signal in the output signal of the solid state imaging device. The electric charge and the false signal are called a smear electric charge and a smear false signal, respectively.

As shown in FIG. 1, the imaging section 4 and the storage section 6 include a plurality of vertical registers 3 and 5, respectively, forming the vertical transfer section. Signal charges generated by the sensor section 2 in the imaging section 4 are transferred through the vertical registers 3 and 5 and the horizontal register 7 sequentially and output from the signal charge detecting section 9. Smear electric charges produced in the vertical registers 3 are discharged by the smear drain section 8.

FIG. 3 is a timing chart of transfer clocks for controlling a transfer driver which drives the vertical register 3 in the conventional CCD solid state imaging device shown in FIG. 1. Drivers that drive the vertical registers 3 and 5, respectively, of the imaging section 4 and the storage section 6 are driven by 4-phase transfer clocks $\phi IM_1$ to $\phi IM_4$ and $\phi ST_1$ to $\phi ST_4$, respectively.

Signal charges that are accumulated in the storage section 6 are output in response to a line shift transfer clock 21 and then a smear discharging and transferring period 22 for discharging smear electric charges from the vertical registers 3 and 5 is carried out. The smear discharging and transferring period 22 is carried out at an extremely high speed because the read-out cycle of the signal charge should be made at high speed.

Then, new signal charges are read out from the vertical register 3 by a charge read-out signal 23. The signal charges thus read out are transferred during a frame shift transfer period 24 from the imaging section 4 to the storage section 6, thereby being accumulated temporarily in the storage section 6. Signal charges are transferred at every line from the horizontal register by a line shift transfer signal 25 and output through the signal charge detecting section 9.

When an object of high brightness is picked up by the conventional image sensor, a smear false signal 45 (see FIG. 5) caused by smear electric charges 41 (see FIG. 4) is reproduced on the upper side of the monitor screen and the quality of picture reproduced on the monitor picture screen is deteriorated because in the conventional image sensor it is not possible to discharge smear electric charges under such conditions. This problem will now be further described with reference to FIG. 4. FIG. 4 show a schematic structure of a cross section taken through the line Y1–Y2 in FIG. 1, and potential levels and charge transfer states at respective positions in the cross section of the conventional image sensor.

As shown in FIG. 4, at time $t_{11}$ (corresponding to time t1 in FIG. 3) at which the line shift transfer was ended, a large smear electric charges 41 had been generated by some cause, such as an illumination of high brightness. The charges 41 accumulate in vertical registers 3. Then, during the period 22 (FIG. 3), the smear discharging and transferring is carried out in order to discharge the smear electric charges 41 accumulated in the vertical registers 3.

Since it is customary that the smear discharging and transferring period 22 is carried out at high speed during an extremely short period of time, it is difficult to discharge the smear electric charges 41 completely. In particular, when there are large smear electric charges 41, the smear electric charges 41 cannot be discharged completely and an appreciable amount are left in the vertical registers 33 of the imaging section 4 even at the time t2 in FIG. 3, i.e., after the discharging and transferring 22 has ended.

In this state, if a read-out signal 23 of new signal charges from the sensor section 2 is carried out (at time t3 of FIG. 3), then signal charges 43 and the residual smear electric charges 41 are mixed with each other, as illustrated in FIG. 4. Mixed electric charges are transferred through the storage section 6 and the horizontal register 7 during a frame shift transfer period 24 and a line shift transfer period 25 and output from the signal charge detecting section 9.

As a consequence, as shown in FIG. 5, the smear false signal caused by the smear electric charge 41 is reproduced on the upper side of the monitor picture screen and the quality of a reproduced picture is deteriorated. Moreover, the amount of smear electric charges is increased as the brightness of object is increased with the result that a lot of smear false signals are generated.

When there are a lot of smear electric charges, the vertical register needs a large driving power to transfer electric charges and the power consumption of the solid state imaging device is increased.

OBJECTS AND SUMMARY OF THE INVENTION

It is therefore a first object of the present invention to provide a method of driving an FIT type solid state imaging device in which power consumption can be reduced.

It is a second object of the present invention to provide a solid state imaging device in which the occurrence of a smear false signal can be suppressed even when an object of high brightness is picked up and in which power consumption required to discharge smear electric charges can be reduced.

In order to attain the first object of the present invention, there is provided a method of driving a solid state imaging device which includes an imaging section for converting incident light into a signal charge and transferring the signal charge and a storage section for temporarily storing the signal charge from the imaging section and transferring the same. This method of driving a solid state imaging device is characterized in that a transfer clock pulse applied to a vertical transfer register in the storage section and fixing a potential within the vertical transfer register to a lower potential than the low level potential of the vertical transfer register of the imaging device to thereby discharge and transfer excess electric charges.

In this case, excess electric charges should preferably be discharged so that the potentials within the vertical transfer register in the storage section are made constant, i.e., made uniform.

According to the present invention, during the discharge and transfer period of excess electric charges generated in the imaging section, excess electric charges are discharged and transferred under the condition that the transfer clock pulses applied to the vertical transfer register in the storage section are stopped. Accordingly, the voltage is fixed and that the potential provided within the vertical transfer register is set to be a lower potential than the low level potential of the vertical transfer register in the imaging section. Therefore, power consumption can be reduced.

Specifically, transfer clock pulses for discharging and transferring excess electric charges are applied to the vertical transfer register in the imaging section and the excess electric charges are discharged to the vertical transfer register of the storage section. The vertical transfer register in the storage section is set to a constant potential and the excess electric charges that were discharged to the storage section are discharged and transferred to the drain region in a so-called continuous manner (may be based on a self-induction drift and thermal diffusion mode). Accordingly, the power consumption for discharging and transferring the excess electric charges in the storage section become substantially zero and the power consumption for driving all of the vertical transfer registers is reduced.

If the potential provided within the vertical transfer register in the storage section is set at a constant value, the excess signal charges in the storage section can be transferred in a continuous manner more smoothly.

An aspect of the present invention is that smear electric charges are coarsely discharged during the early stage of the smear electric charge discharge and transfer period.

According to a second aspect of the present invention, there is provided a solid state imaging device which comprises an imaging section including a plurality of sensor sections arranged in horizontal and vertical directions and first group of vertical transfer sections disposed between each vertically arranged sensor section to sequentially transfer signal charges read out from each sensor section in the vertical direction by movement of potential wells; a storage section having second vertical transfer sections corresponding to the first vertical transfer sections for receiving signal charges transferred from the first vertical transfer sections by movement of the potential well and for temporarily storing the signal charge. A horizontal transfer section reads the signal charges transferred thereto from the second vertical transfer section at a predetermined timing and transfers the same in the horizontal direction. A signal read-out section reads signal charges sequentially transferred from the horizontal transfer section, and a smear drain section discharges unnecessary electric charges from the first and second vertical transfer sections. A coarse unnecessary electric charge discharge period is provided in which the potential level of at least one of the first and second vertical transfer sections is arranged to be flat in the transfer direction by the application of a vertical gate clock voltage.

Further, the present invention relates to a method of driving a frame transfer interline solid state imaging device which includes a vertical transfer section for transferring signal charges and for discharging and transferring smear electric charges by moving potential wells. This method of driving a solid state imaging device is characterized in that there is provided a smear electric charge coarse discharge period in which potential levels of the vertical transfer section are arranged to be uniform in the transfer direction by the application of a vertical gate clock voltage prior to the discharging and transferring signal charges.

In the coarse discharge period used by the solid state imaging device and the driving method thereof according to the present invention, the potential levels of the vertical transfer section are arranged to be flat in the transfer direction by the application of the vertical gate clock voltage in the vertical transfer section in which electric charges are transferred by moving the potential wells in the transfer direction, whereby a large quantity of smear electric charges are coarsely discharged one at a time without the transfer clock.

According to the solid state imaging device of the present invention, this smear electric charge coarse discharge period should preferably accompany the succeeding smear electric charge discharge and transfer period. However, the accompaniment of the succeeding smear electric charge discharge and transfer period is not indispensable for the present invention.

According to another preferred embodiment of the present invention, the smear drain section is disposed adjacent to the second vertical transfer section. The potential level of the first vertical transfer section is held at a low level and the potential level of the second vertical transfer section is held at a high level in the transfer direction. Then, the smear electric charges are discharged to the smear drain section from the first vertical transfer section through the second vertical transfer section.

Alternatively, there may be provided first and second smear drain sections corresponding to the first and second vertical transfer sections. During the coarse discharge period, only the potential level of the first vertical transfer section is arranged to be flat and the second vertical transfer section may, for example, carry out a line shift transfer. There is then the advantage that the coarse discharge period can be extended.

Specifically, there is provided a solid state imaging device which comprises an imaging section including a plurality of sensor sections arranged in horizontal and vertical directions and first vertical transfer sections disposed between each vertically arranged sensor section for sequentially transferring signal charges read out from each sensor section in the vertical direction by movement of potential wells. A storage section having second vertical transfer sections corresponding to the first vertical transfer sections, receives signal charges transferred from the first vertical transfer sections by movement of the potential well and temporarily stores the signal charges. A horizontal transfer section reads signal charges transferred thereto from the second vertical transfer section at a predetermined timing and transfers the same in the horizontal direction. A signal read-out section reads signal charges sequentially transferred from the horizontal transfer section. A first smear drain section discharges unnecessary electric charges from the first and second vertical transfer sections, and a second smear drain section discharges unnecessary electric charges from the first and second vertical transfer sections. A coarse unnecessary electric charge discharge period is provided in which a potential level of at least one of the first and second vertical transfer sections is arranged to be flat in the transfer direction by the application of a vertical gate clock voltage.

According to the solid state imaging device of the present invention and the driving method thereof, since the smear electric charge generated in the vertical transfer section can be freely moved in the vertical transfer section of the same potential level by arranging the potential level of at least one of the vertical transfer sections to be flat in the transfer direction, the electric charges are transferred without the clock signal and at least one portion of the electric charges is discharged to the smear drain section one at a time. Therefore, a rapid coarse discharge of smear electric charges becomes possible.

Then, when smear electric charges are discharged and transferred, it is sufficient that only the small, residual quantity of smear electric charges that were left after the coarse discharge be transferred. Therefore, the high speed discharge and transfer does not need a large driving force and the essentially complete discharge of smear electric charge becomes possible.

The above and other objects, features, and advantages of the present invention will become apparent from the following detailed description of illustrative embodiments thereof to be read in conjunction with the accompanying drawings.

BRIEF DESCRIPTION OF THE DRAWINGS

FIG. 10 is a table showing power consumption according to the embodiment of the present invention;

FIG. 13 is a table showing power consumptions in the second embodiment of the present invention;

DETAILED DESCRIPTION OF THE PREFERRED EMBODIMENTS

A method of driving an FIT type CCD solid state imaging device according to an embodiment of the present invention will be described with reference to the drawings.

Figure 1:
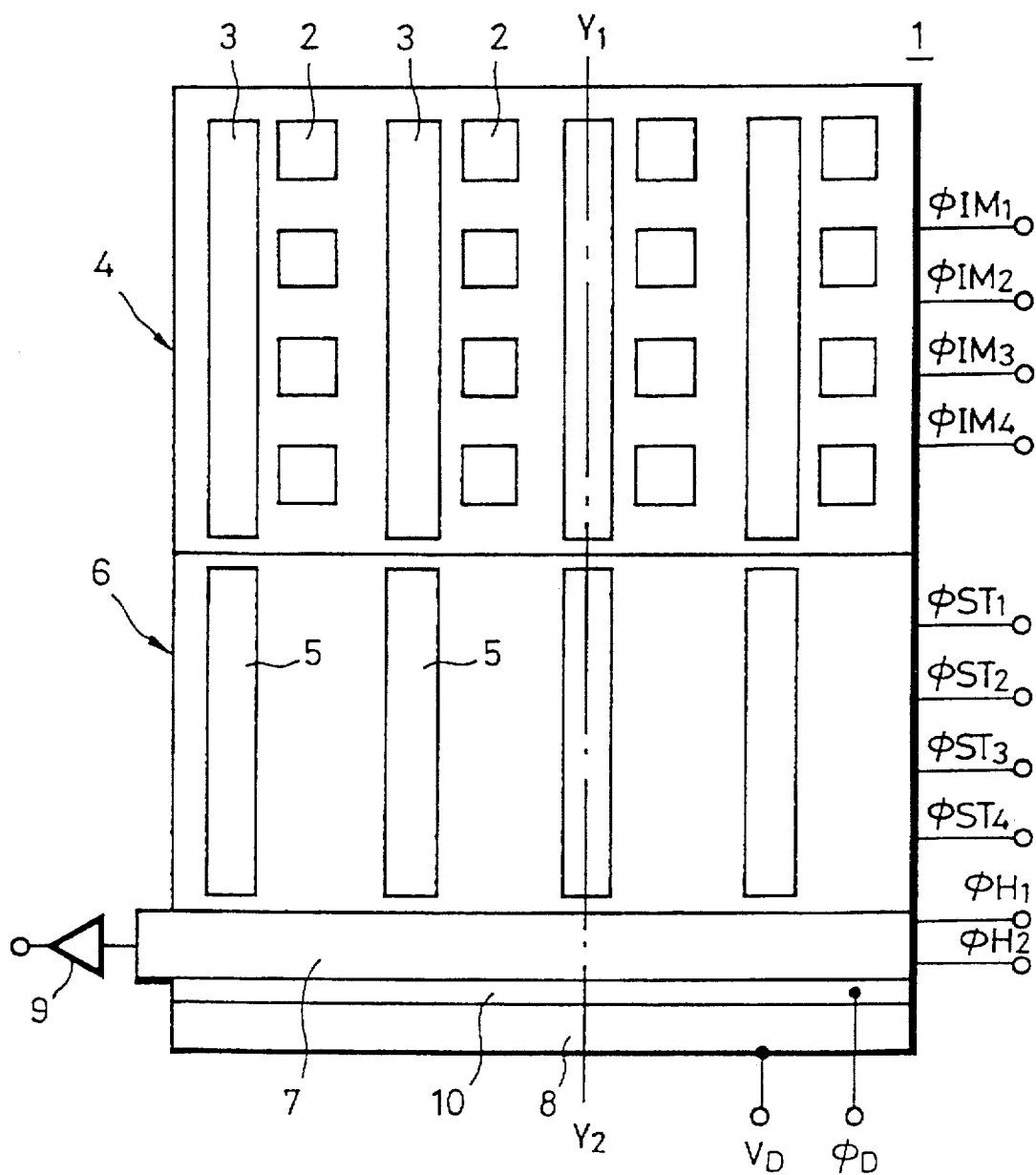
FIG. 1 is a diagram showing a structure of a conventional FIT type CCD solid state imaging device.
Figure 2:
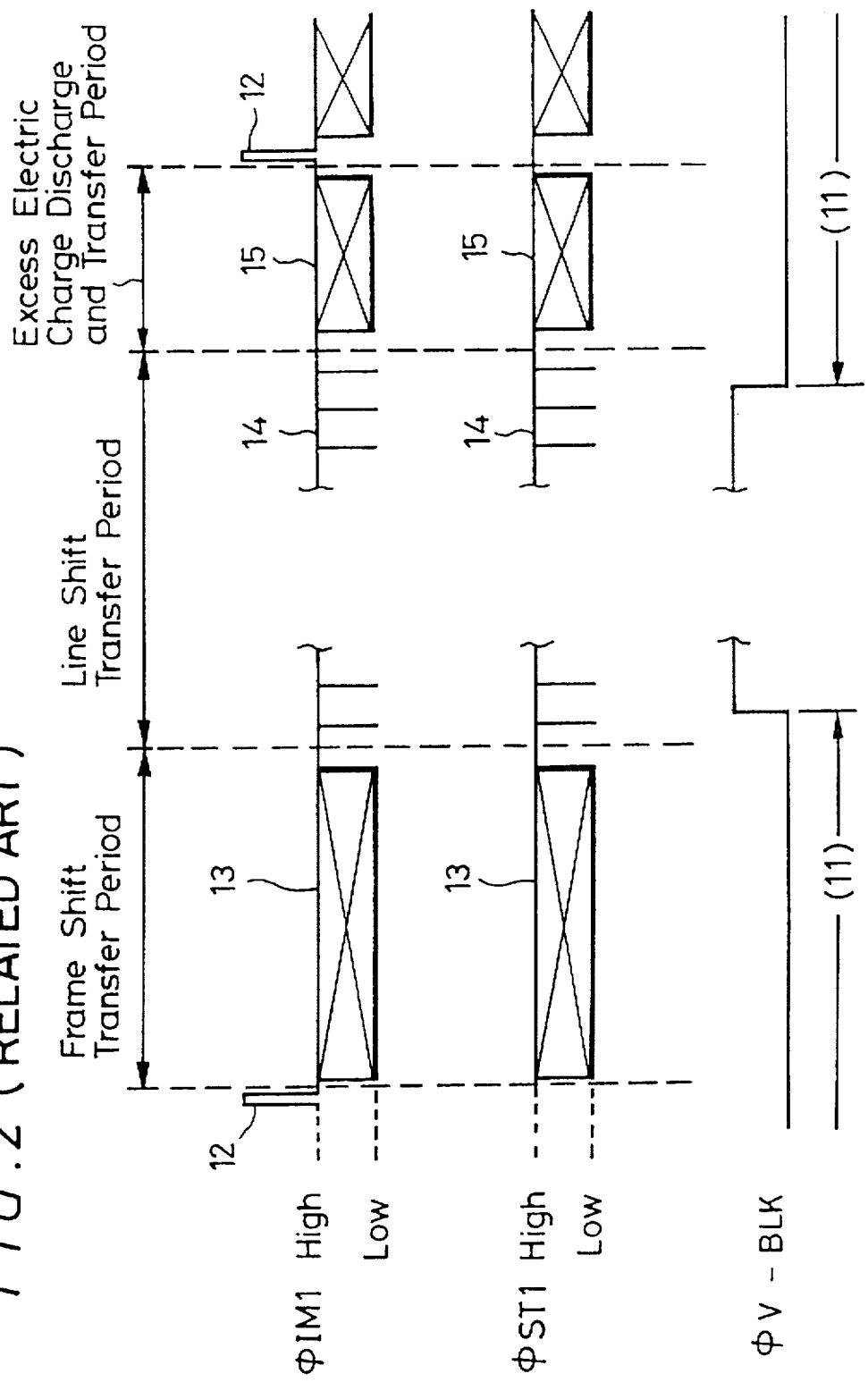
FIG. 2 is a timing chart of transfer clock pulses according to a conventional driving method.
Figure 3:
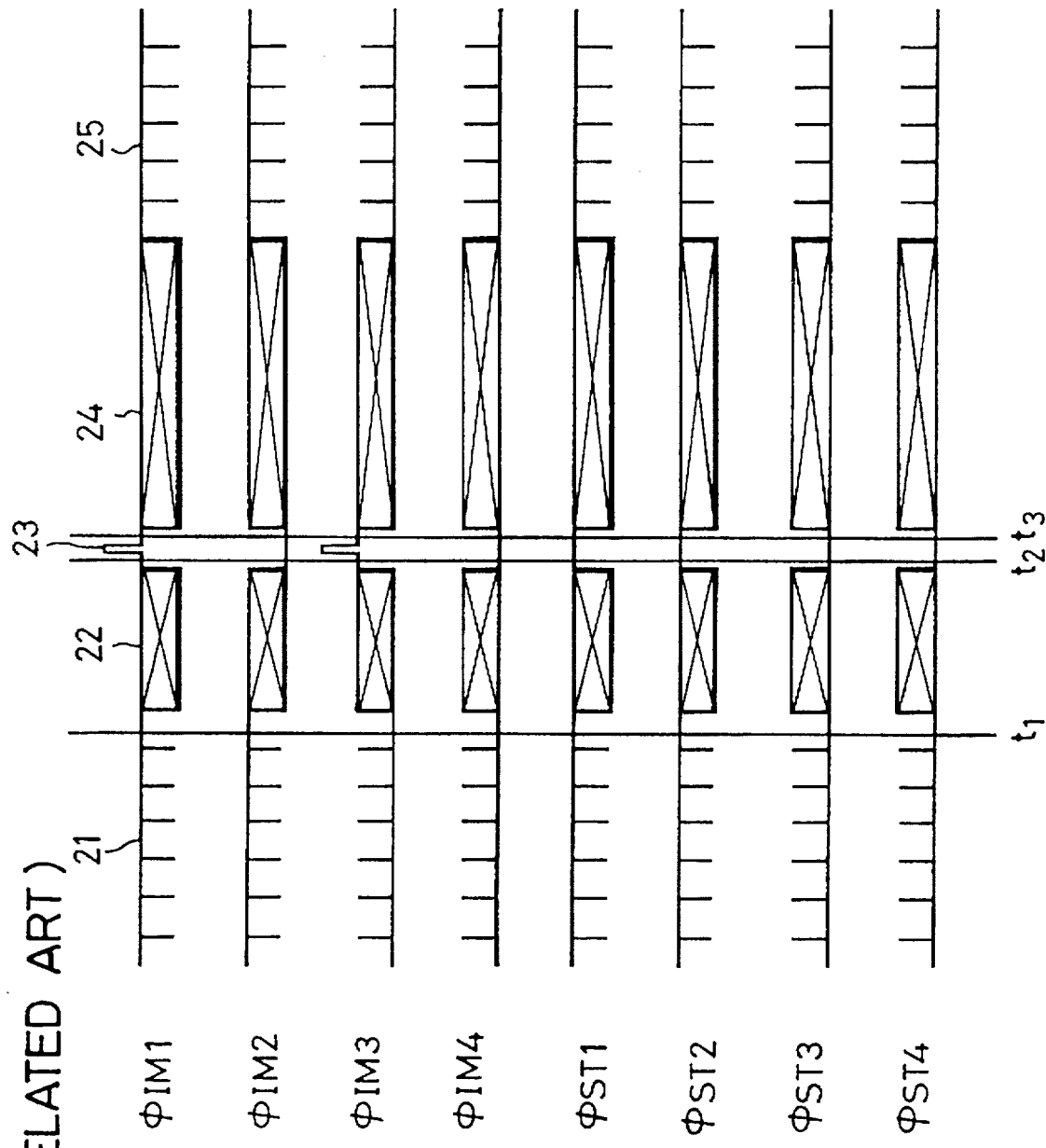
FIG. 3 is a timing chart showing the timing of electric charge transfer clocks used in the conventional solid state imaging device.
Figure 4:
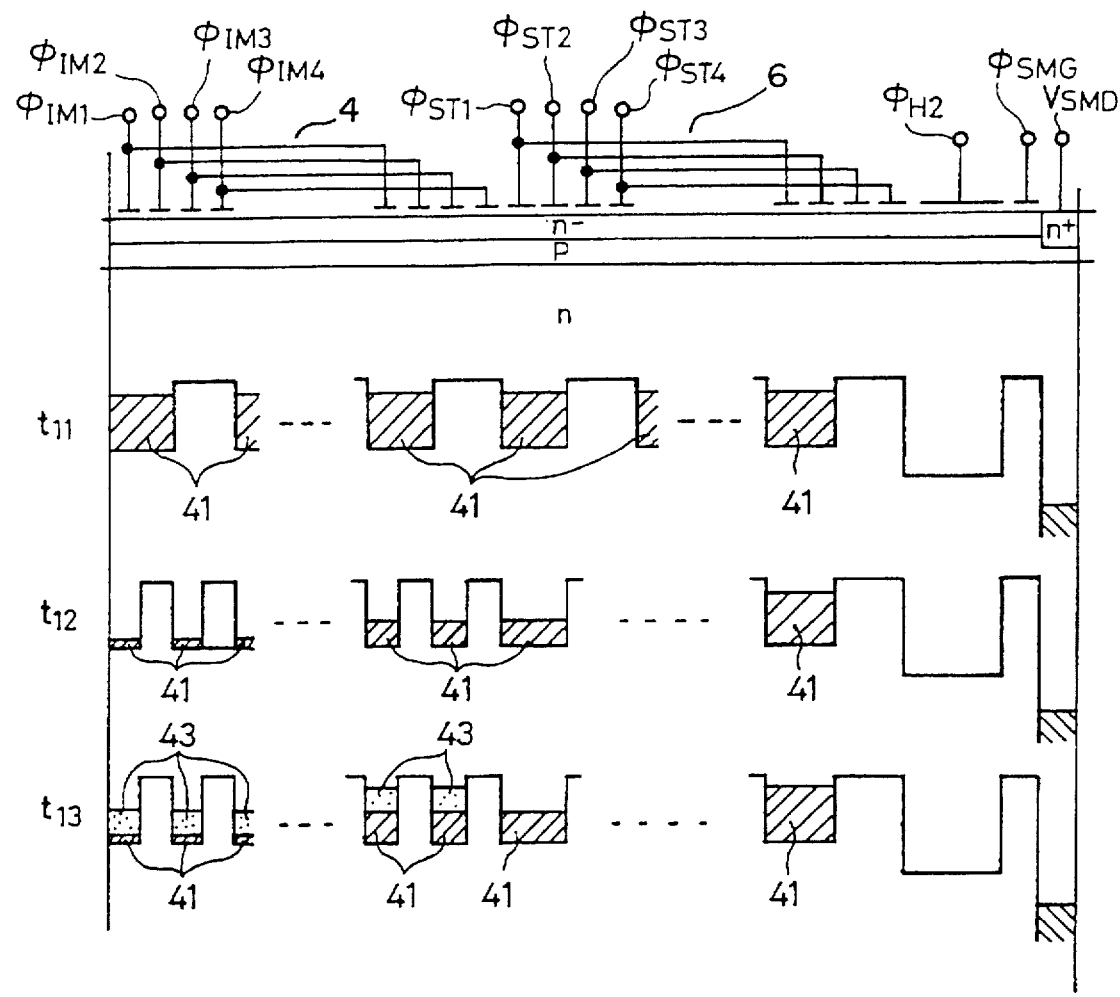
FIG. 4 is a schematic diagram showing a cross-sectional structure of the vertical register of FIG. 1 and illustrates potential levels of that portion and the transferred states of smear electric charges.
Figure 5:
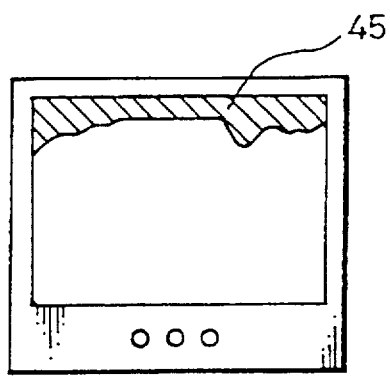
FIG. 5 is a front view of a monitor used to explain a smear false signal produced from an output of a conventional solid state imaging device.
Figure 6:
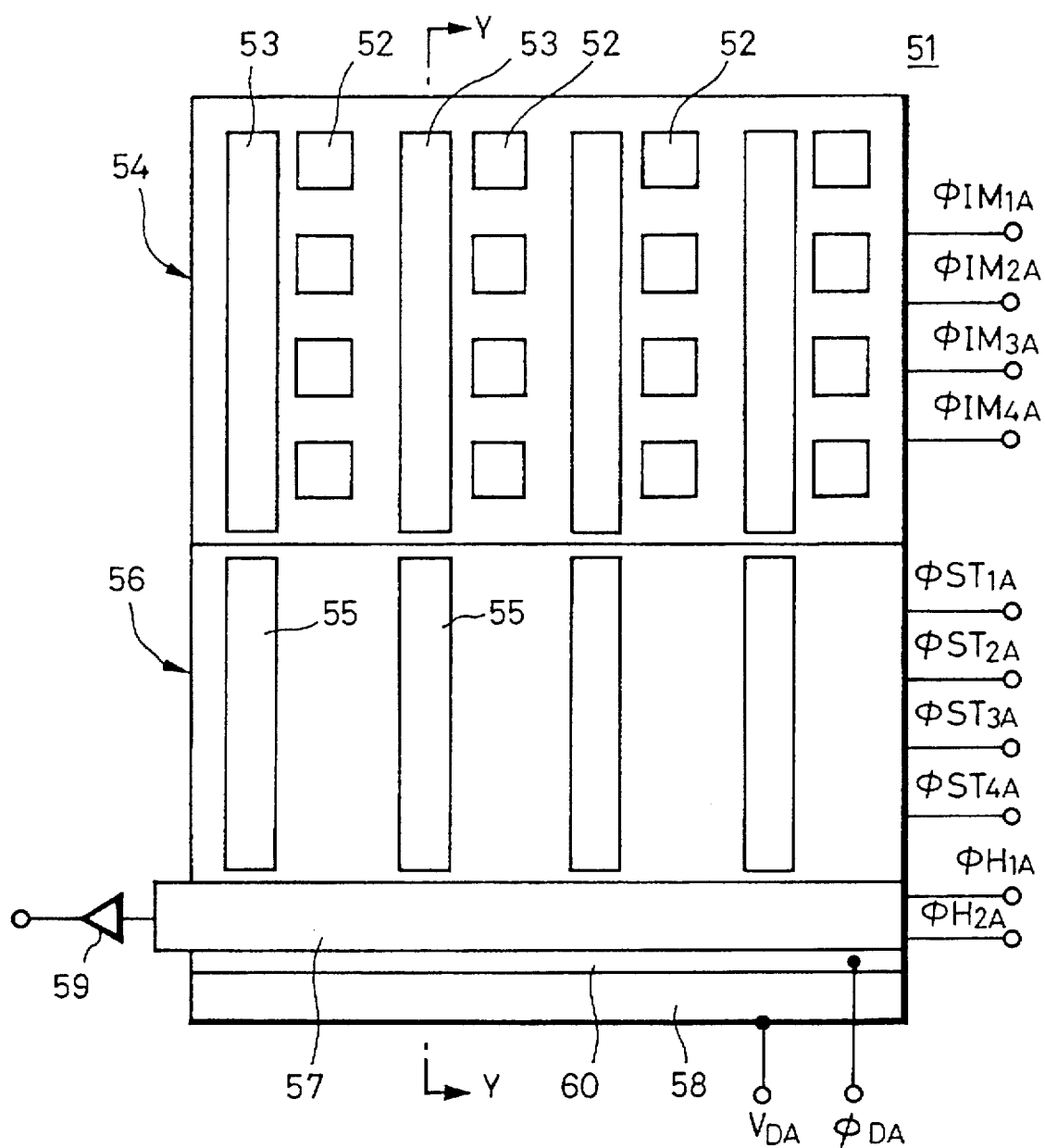
FIG. 6 is a diagram showing a structure of a typical FIT type CCD solid state imaging device which is applied to the present invention.

FIG. 6 is a diagram showing an overall arrangement of a typical FIT type solid state imaging device 51 to which a driving method according to a first embodiment of the present invention is applied. Similarly to FIG. 1, the FIT CCD solid state imaging device comprises an imaging section 54 having a number of sensor sections 52 serving as pixels arranged in a two-dimensional array fashion and vertical transfer registers 53 having CCD structure provided alongside of each column of sensor sections, a storage section 56 having a plurality of vertical transfer registers 55 formed of CCDs corresponding to the vertical transfer registers 53 in the imaging section 54, a horizontal transfer register 57 formed of a CCD, a drain region 58 disposed adjacent to the horizontal transfer register 57 on the opposite side of the storage section 56 through a gate section 60 and a signal charge detecting section 59 connected to the final stage of the horizontal transfer register 57.

The vertical transfer registers 53 in the imaging section 54 are driven by 4-phase vertical transfer clock pulses $\phi IM_{1A}$, $\phi IM_{2A}$, $\phi IM_{3A}$, $\phi IM_{4A}$, and the vertical transfer registers 55 in the storage section 56 are driven by 4-phase vertical transfer clock pulses $\phi ST_{1A}$, $\phi ST_{2A}$, $\phi ST_3A$, $\phi ST_{4A}$. The horizontal transfer register 57 is driven by 2-phase horizontal transfer clock pulses $\phi H_1$, $\phi H_2$. A clock pulse $\phi_D$ is applied to the gate section 60, and a DC voltage $V_D$ is applied to the drain region 58.

Figure 7:
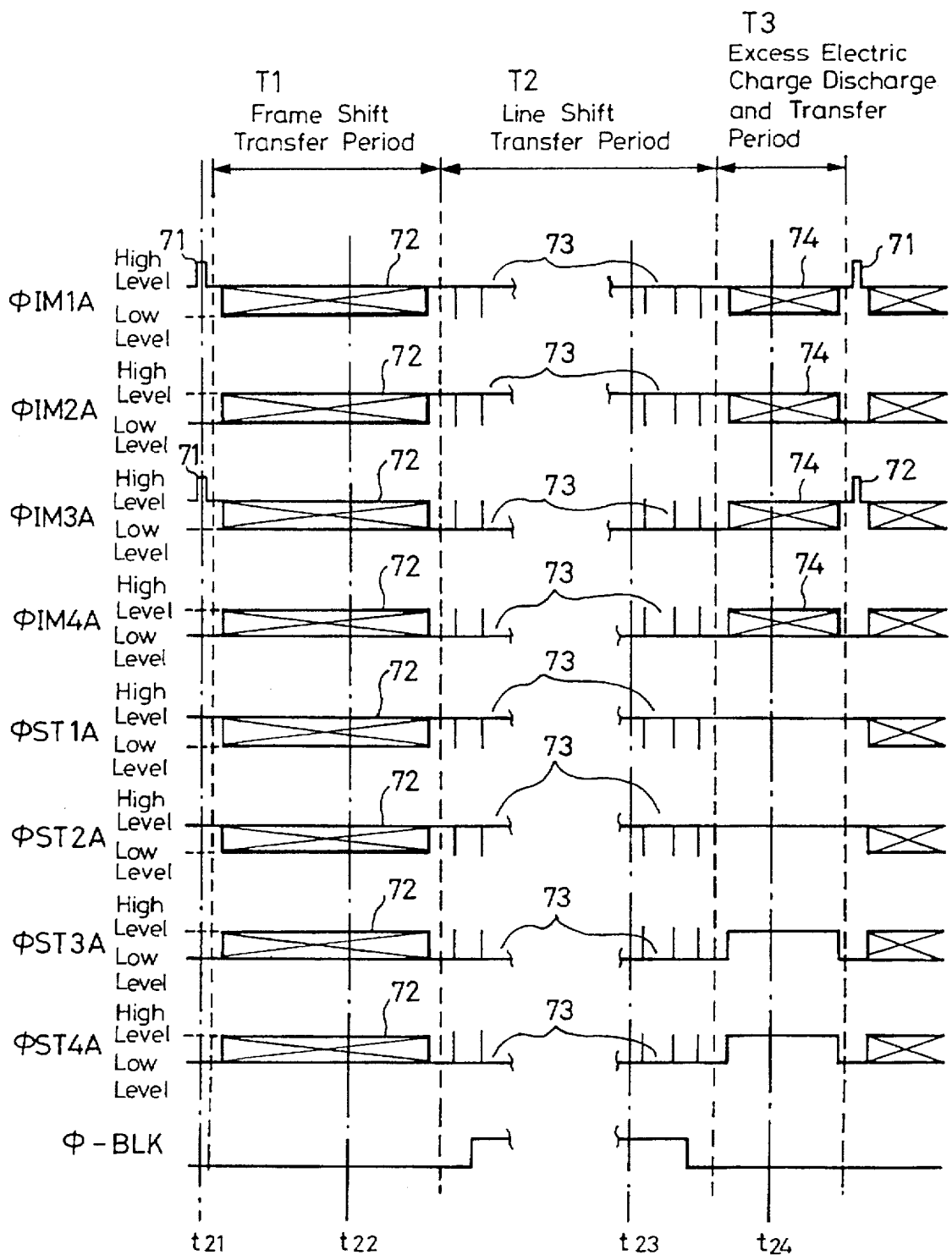
FIG. 7 is a timing chart of transfer clock pulses showing a driving method according to a first embodiment of FIG. 8 is a cross-sectional view taken along the line Y—Y in FIG. 6.

FIG. 7 is a timing chart of the vertical transfer clock pulses $\phi IM_{1A}$, $\phi IM_{2A}$, $\phi IM_{3A}$, $\phi IM_{4A}$, $\phi ST_{1A}$, $\phi ST_{2A}$, $\phi ST_{3A}$, $\phi ST_{4A}$ and a vertical blanking pulse $\phi V$-BLK. FIGS. 12A through 12D are diagrams of waveforms of the transfer clock pulses $\phi IM$, $\phi ST$ used when signal charges are transferred by the vertical transfer registers 53, 55.

Figure 8:
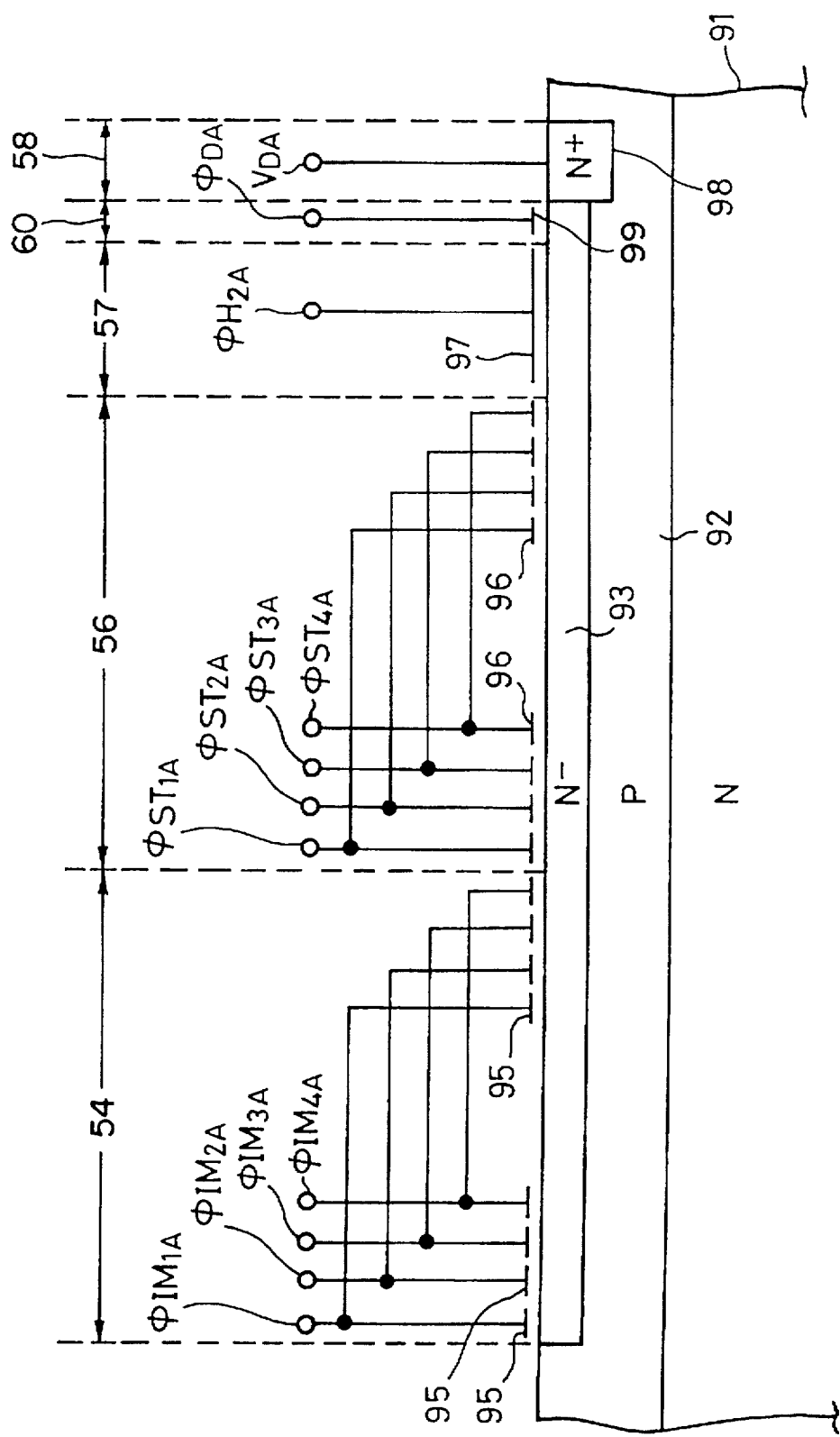
Figure 9:
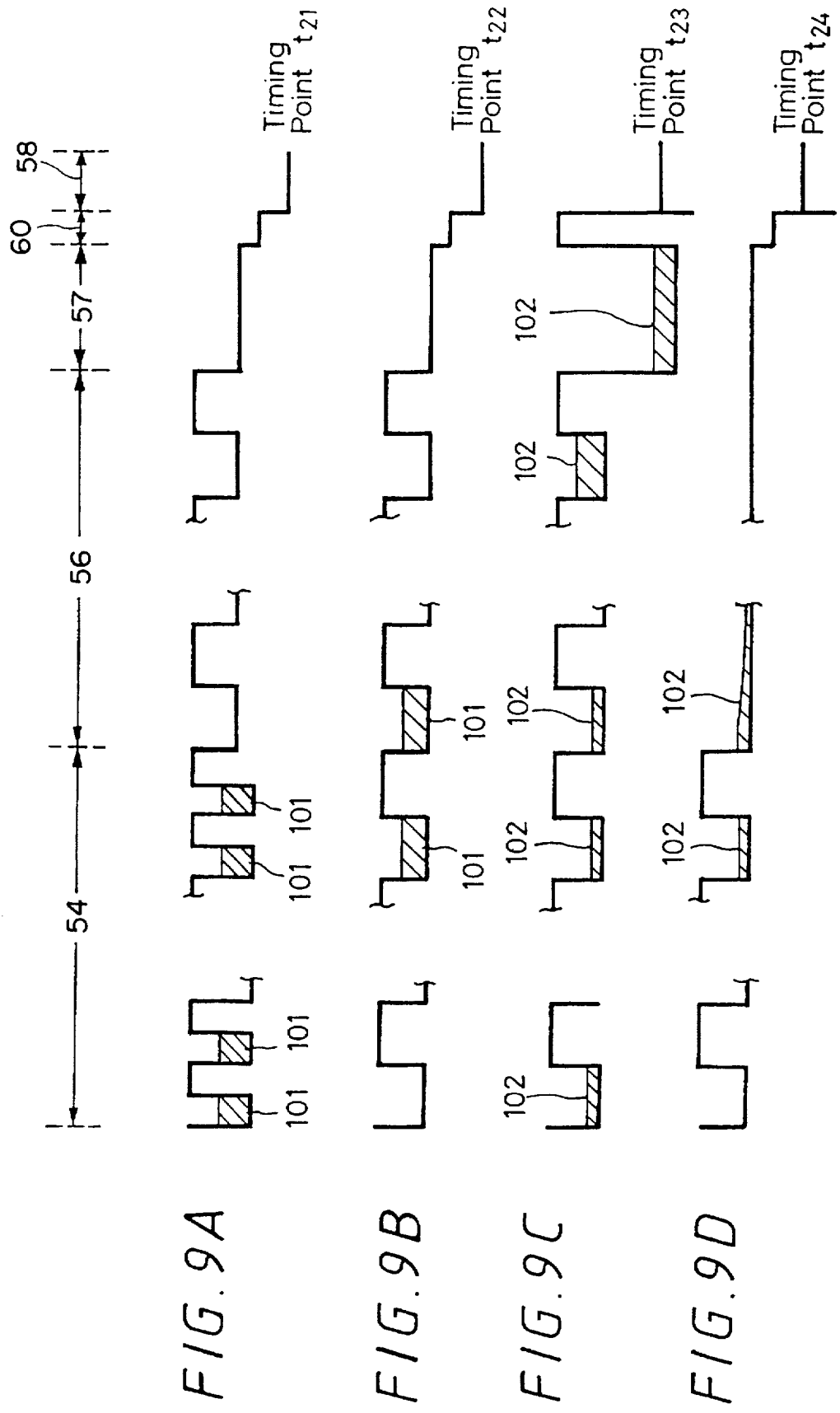
FIGS. 9A, 9B, 9C and 9D are potential diagrams showing electric charge transferred states at time points t1 to t4 according to a first embodiment of the present invention.

FIG. 8 is a cross-sectional view taken along the line Y—Y in the CCD solid state imaging device 21 shown in FIG. 6. FIG. 9 is a potential diagram showing the transferring of electric charges at the above cross section according to the driving method of FIG. 7 at different time intervals.

As shown in the cross-sectional view of FIG. 8, a second conductivity type material, i.e., a P type material well region 92 is formed on a first conductivity type material, for example, N type silicon semiconductor substrate 91, and an N type transfer channel 93 is formed on the P type well region 92. The vertical transfer register 53 is formed by arranging a plurality of transfer electrodes 95 applied with the transfer clock pulses $\phi IM_{1A}$, $\phi IM_{2A}$, $\phi IM_{3A}$, $\phi IM_{4A}$ through a gate insulating film on a portion of the transfer channel 93 corresponding to the imaging section 54. The vertical transfer register 55 is formed by arranging a plurality of transfer electrodes 96 applied with the transfer clock pulses $\phi ST_{1A}$, $\phi ST_{2A}$, $\phi ST_{3A}$, $\phi ST_{4A}$ through a gate insulating film on the portion of transfer channel region 93 corresponding to the storage section 56.

The horizontal transfer register 57 is formed of an array of a plurality of transfer electrodes 97 applied with a transfer clock pulses $\phi H_{1A}$, $\phi H_{2A}$ on the corresponding portion transfer channel region 93 through the gate insulating film in the direction perpendicular to the sheet of drawing of FIG. 8. In the view shown in FIG. 8, only one such transfer electrode 97 is shown.

The drain region 58 is formed of an $N^+$ diffusion region 98 having an applied DC voltage $V_{DA}$. The gate section 90 is arranged by forming a gate electrode 99 having an applied clock pulse $\phi_{DA}$ on the region 93 provided between the $N^+$ diffusion region 98 and the horizontal transfer register 57 through a gate insulating film.

A read-out operation according to the first embodiment of the present invention will be described with reference to FIGS. 6 to 9.

Initially, at a time t21 during the vertical blanking period, signal charges 101 that were photoelectrically-converted by the sensor sections 52 are read out from the sensor sections 52 to the vertical transfer register 53 in response to a read-out pulse 71 (see FIG. 7). The signal charges thus read out are transferred to the under portions of the first and third transfer electrodes 95 (FIG. 8) to which the clock pulses $\phi IM_{1A}$, $\phi IM_{3A}$ (see FIG. 9A) are applied. Though not shown, signal charges 101 corresponding to two lines will be mixed and transferred in response to odd and even fields of the interlaced scanning.

Subsequently, the signal charge 101 is transferred from the imaging section 54 to the vertical transfer register 55 in the storage section 56 at high speed in response to the frame shift transfer pulse 72 in the vertical transfer clock pulses $\phi IM_{1A}$ to $\phi IM_{4A}$ and $\phi ST_{1A}$ to $\phi ST_{4A}$ (see FIG. 7). FIG. 9B shows the state to which the signal charges are transferred at the time t22 which occurs during the frame shift transfer period $T_1$.

The signal charges 101 are transferred at every horizontal line to the horizontal transfer register 57 in response to a line shift transfer pulse 73 in the vertical transfer clock pulses $\phi IM_{1A}$ to $\phi IM_{4A}$ and $\phi ST_{1A}$ to $\phi ST_{4A}$, whereafter the signal charges 101 are transferred within the horizontal transfer register 57 in response to the horizontal transfer clock pulses $\phi H_{1A}$, $\phi H_{2A}$ and output from the signal charge detecting section 59. FIG. 9C shows the state to which the signal charges are transferred at time t23, which occurs during the line shift transfer period $T_2$. The gate section 60 is held at a high level potential during the period $T_2$.

Thereafter, excess electric charges 102, such as a smear component remaining within the imaging section 54 and a dark current component, are discharged to the storage section 56. The excess electric charges 102 are discharged to the drain region 58 from the storage section 56 through the horizontal transfer register 57 and the gate section 60.

The signal charges 101 are then again read out from the sensor section 52 in response to another read-out pulse 71. The read-out operation of the FIT type CCD solid state imaging device is carried out by repeating the above-mentioned operation.

According to the first embodiment of the present invention, during the excess electric charge discharge and transfer period $T_3$, the imaging section 54 receives the vertical transfer clock pulses $\phi IM_{1A}$ to $\phi IM_{4A}$ which comprise the excess electric charge discharging and transferring pulse 74. The vertical transfer clock pulses $\phi ST_{1A}$ to $\phi ST_{4A}$ to the storage section 56 comprise a high level voltage, whereby the potential (so-called channel potential) within the vertical transfer register 55 in the storage section 56 is held at a high level, thereby making it possible to reduce power consumption.

During the excess electric charge discharging and transferring period $T_3$, the vertical transfer register 53 in the imaging section 54 discharges the excess electric charges 102 to the storage section 56 in response to the high speed transfer clock pulse for discharge and transfer excess electric charges, i.e., excess electric charge discharging and transferring pulse 74. The vertical transfer register 55 in the storage section 56 discharges and transfers the excess electric charges 102 freely. It is considered that this free transferring is mainly based on a self-induction drift and a thermal diffusion mode.

Inasmuch as this free transferring is slow in electric charge transferring speed as compared with transferring using the high speed transfer clock pulse in the imaging section 54, i.e., the excess electric charge discharging and transferring pulse 74, it is expected that a lot of excess electric charges remain in the storage section 56. However, even though much excess electric charges 102 remain in the storage section 56, it is sufficient if the excess electric charges 102 are sufficiently transferred from the imaging section 54 to the storage section 56. That is, according to this embodiment, the excess electric charge 102 is discharged from the imaging section 54 by the high speed transfer clock 74, which causes no trouble in actual practice, even when the excess electric charge 102 remains in the storage section 56. The remaining excess electric charge will be discharged from the storage section 56 to the drain region 58 during the succeeding frame shift transfer from the storage section 56. Thus, there is then no problem.

In the first embodiment, the power consumption for driving the vertical transfer registers 53, 55, is roughly estimated as follows.

As shown in FIG. 10, while the power consumption required for the transfer of electric charges in the imaging section 54 and the storage section 56 are almost the same, according to this embodiment, the power consumption required when the excess electric charges are discharged in the storage section 56 become almost zero. Therefore, the power consumption that is required to drive the vertical transfer registers 53, 55 is reduced to about ⅝.

While the vertical transfer register is driven by the 4-phase driving mode as described above, the present invention is not limited thereto and can be applied to a vertical transfer register that is driven under other driving modes, such as a three-phase driving system or the like.

Further, while the clocks of the transfer pulses $\phi ST_{1A}$ to $\phi ST_{4A}$ in the storage section 56 are fixed and held at high level voltages during the entire excess electric charge transfer period $T_3$ as described above, these clock pulses $\phi ST_{1A}$ to $\phi ST_{4A}$ are not always fixed and held at high level voltages. The transfer pulses $\phi ST_{1A}$ to $\phi ST_{4A}$ of the storage section 56 may be stopped and held at high level voltage for only part of the excess electric charge discharging and transferring period $T_3$ with the objects of the present invention being achieved to some extent.

The driving method according to a second embodiment of the present invention will be described below. According to this embodiment, in addition to the first embodiment, if the clocks of the line shift transfer pulses in the vertical transfer clock pulses $\phi IM_{1A}$ to $\phi IM_{4A}$ of the imaging section 54 are stopped and then held at a constant voltage, the power consumption reducing effect may be enhanced.

Figure 11:
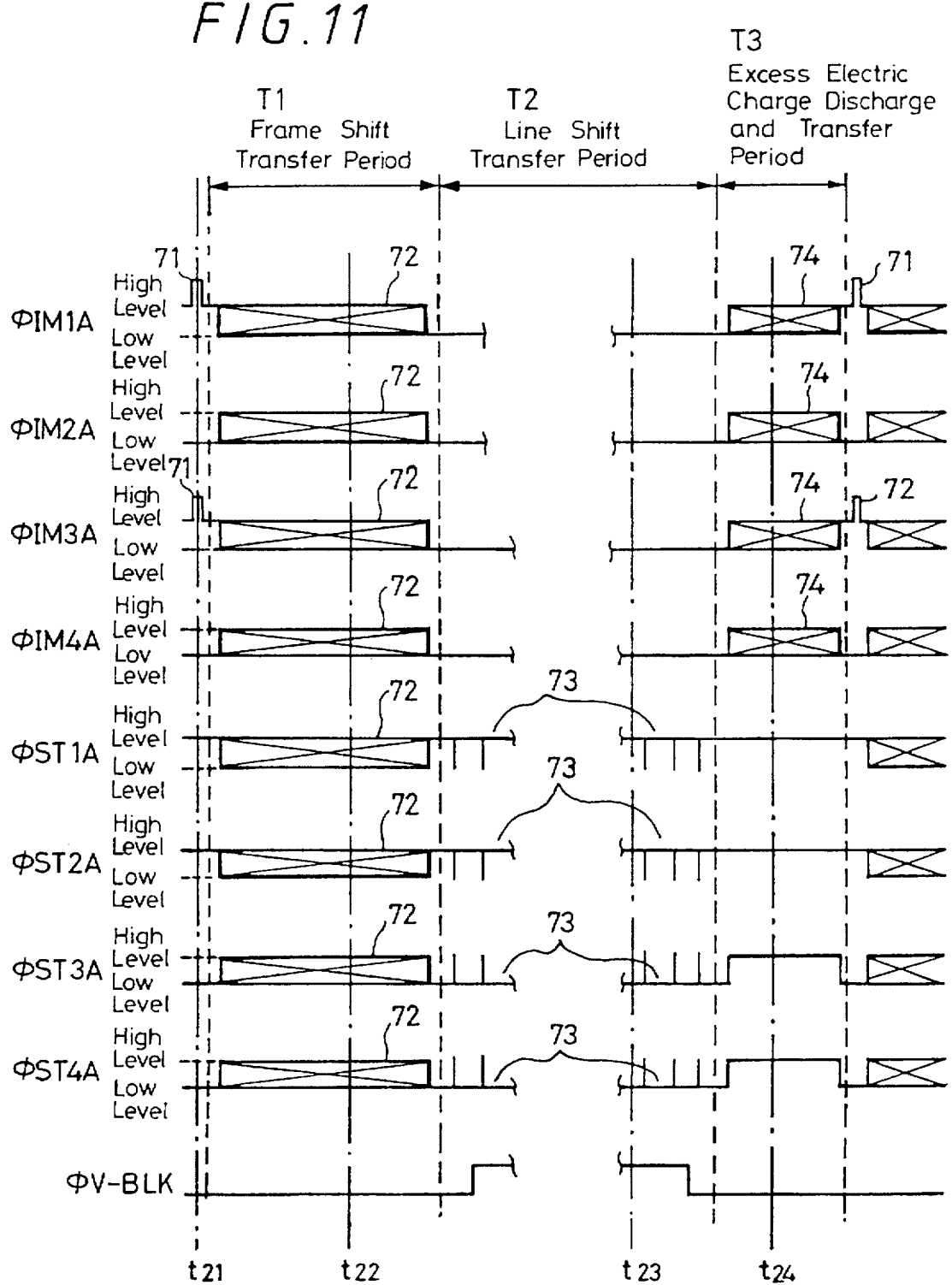
FIG. 11 is a timing chart of transfer clock pulses showing a driving method according to a second embodiment of the present invention.

FIG. 11 is a timing chart of vertical transfer clock pulses $\phi IM_{1A}$, $\phi IM_{2A}$, $\phi IM_{3A}$, $\phi IM_{4A}$, $\phi ST_{1A}$, $\phi ST_{2A}$, $\phi ST_{3A}$, $\phi ST_{4A}$ and vertical blanking pulse $\phi V$-BLK according to the second embodiment of the present invention.

FIG. 12 is a potential diagram showing the condition that electric charges are transferred by the driving method shown in FIG. 11 at the times t21 to t24.

Figures 12A, 12B, 12C, 12D:
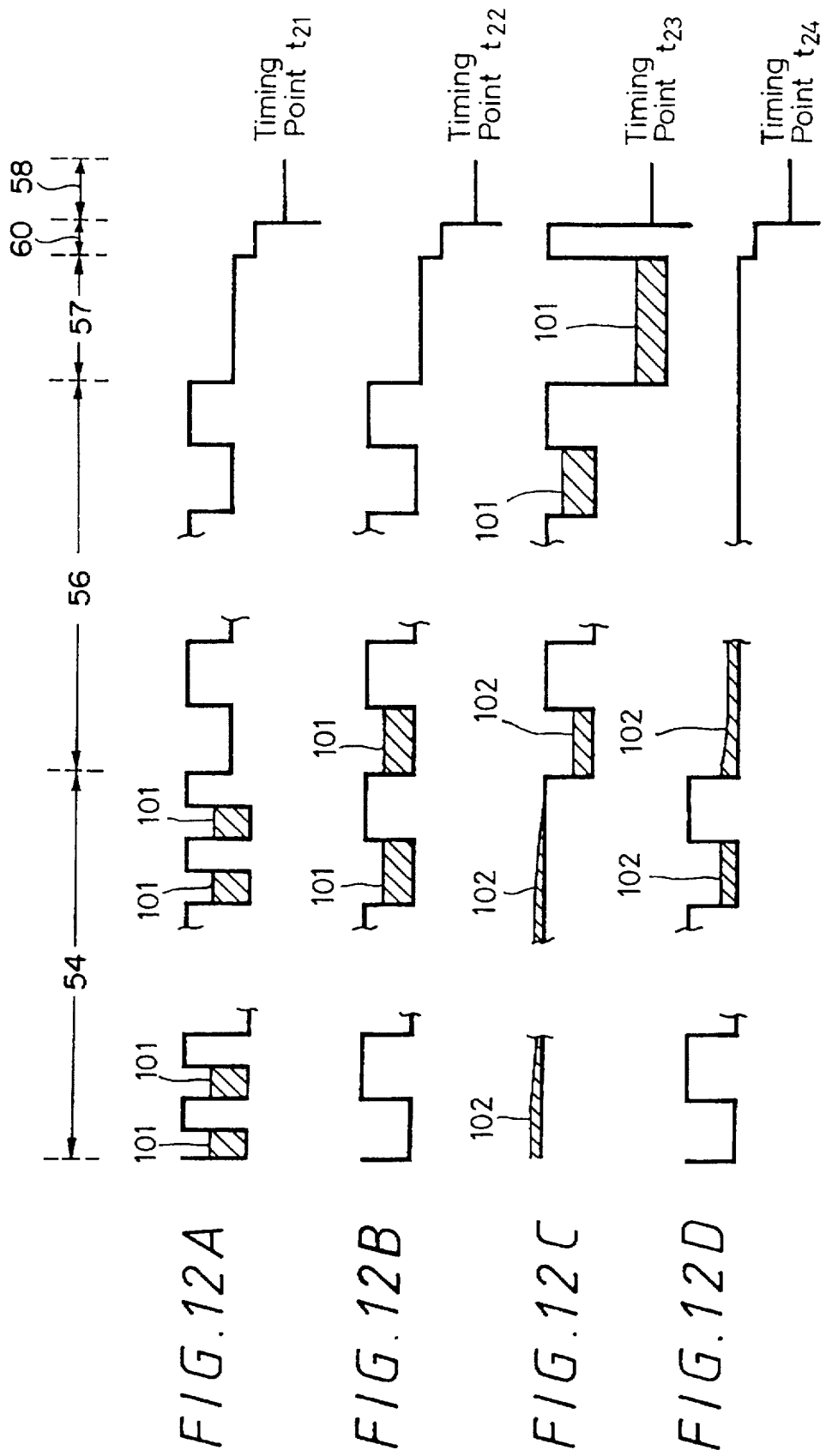
FIGS. 12A, 12B, 12C and 12D are potential diagrams showing electric charge transferred states at time points t21 to t24 according to a second embodiment of the present invention.
Figure 14:
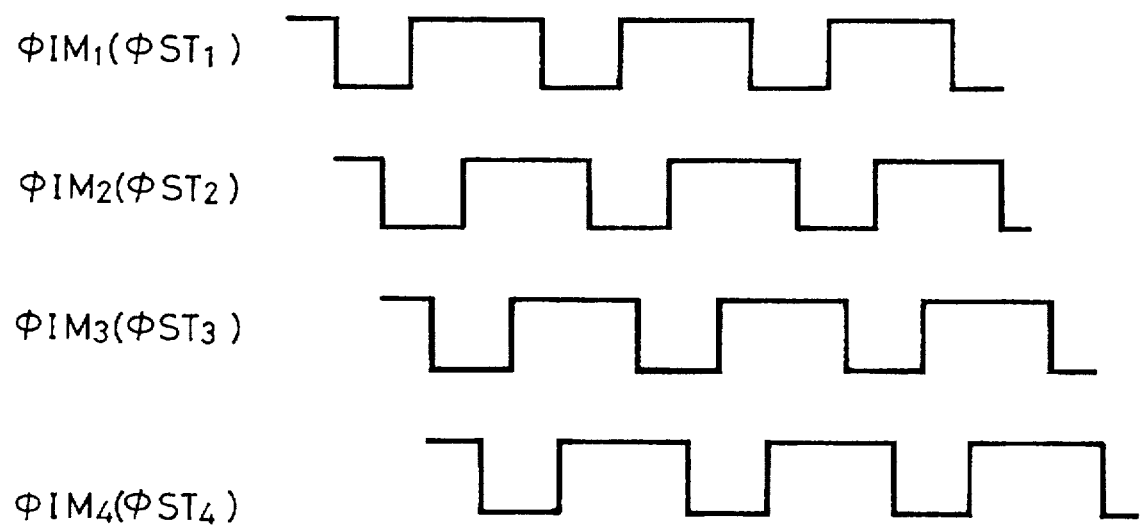
FIG. 14 is a diagram of waveforms of vertical transfer clock pulses $\phi IM_1$ to $\phi IM_4$ and $\phi ST_1$ to $\phi ST_4$.

According to this embodiment, during the excess electric charge discharging and transferring period T3, the clock transfer pulses $\phi ST_{1A}$, $\phi ST_{2A}$, $\phi ST_{3A}$, and $\phi ST_{4A}$ to the storage section 56 are stopped and fixed to high level voltages, thereby setting the potential produced within the vertical transfer register 55 in the storage section at high level (see FIG. 12D).

Further, during the line shift transfer period $T_2$, the vertical transfer clock pulses $\phi IM_{1A}$, $\phi IM_{2A}$, $\phi IM_{3A}$, $\phi IM_{4A}$ are stopped and fixed at constant voltages (low level voltages), thereby setting the potential provided within the vertical transfer register 53 in the imaging section 54 to a constant level (see FIG. 12C).

According to this driving method, the excess electric charge discharging pulses in the vertical transfer clock pulses $\phi ST_{1A}$ to $\phi ST_{4A}$ to the storage section 56 can be omitted and the line shift transfer pulses to the vertical transfer clock pulses $\phi IM_{1A}$, $\phi IM_{2A}$, $\phi IM_{3A}$ and $\phi IM_{4A}$ to the imaging section 54 also can be omitted, thereby reducing power consumption even more.

Even when the line shift transfer of the imaging section 54 is stopped, the signal charge 101 is transferred in the storage section 56 as shown in FIG. 12C. There may be a problem.

Further, if the potential produced within the vertical transfer register 53 in the imaging section 54 during the line shift transfer period $T_2$ is arranged to be a low level as described above, then the excess electric charge 102 produced in the imaging section 54 can be constantly discharged to the storage section 56 so that much of the excess electric charges 102 can be prevented from being left in the imaging section 54.

According to the second embodiment of the present invention, the power consumption for driving the vertical transfer registers 53, 55 can be roughly estimated as follows.

As shown in FIG. 13, while the power consumption for the respective transfers to the imaging section 54 and the storage section 56 are all approximately the same according to the prior art, according to this embodiment, the power consumption required to discharge and transfer excess electric charges to the storage section 56 and the power consumption required to effect the line shift transfer to the imaging section 54 become substantially zero. Accordingly, the power consumption necessary for driving the vertical transfer registers 53, 55 is reduced to about ⅔.

While the vertical transfer clock pulses in the imaging section 54 are stopped during the whole of the line shift transfer period $T_2$ as described above, the vertical transfer clock pulses need not always be stopped. If the vertical transfer pulses $\phi IM_{1A}$ to $\phi IM_{4A}$ to the imaging section 54 are stopped and then fixed to low level voltages during at least a portion of the line shift transfer period $T_2$, then the objects of the present invention can be attained to some extent.

Also, according to this embodiment, if the transfer pulses $\phi ST_{1A}$ to $\phi ST_{4A}$ to the storage section 56 are stopped and fixed to high level voltages during at least a portion of the excess electric charge discharge and transfer period $T_3$, then the objects of the present invention can be achieved to some extent.

While the vertical transfer register is driven under the 4-phase driving mode as described above, the present invention is not limited thereto and the present invention can similarly be applied to a vertical transfer register that is driven under other driving modes, such as a 3-phase driving mode or the like.

While the potential of the vertical transfer registers in the storage section 56 are set to be at a constant potential (high level voltage) and the potential within the vertical transfer register 55 are all set to be of a constant level when excess electric charges are discharged and transferred according to the first and second embodiments of the invention, the present invention is not limited thereto and the following variant is also possible. Potential levels within other vertical transfer registers 55 may not always be held uniform. Specifically, if the transfer pulses $\phi ST_{1A}$ to $\phi ST_{4A}$ are stopped such that the potential within the vertical transfer register 55 is set to be deeper than the potential of low level of the vertical transfer register 53 in the imaging section 54, then the excess electric charges can be discharged. In this case, if the potential within the vertical transfer register 55 is set to be at a constant level potential, then excess electric charges can be discharged more smoothly.

According to the present invention, it is possible to reduce the power consumption of the FIT type CCD solid state imaging device. Therefore, the power consumption of the FIT type CCD camera can be reduced and the FIT type CCD camera can be miniaturized.

Figure 15:
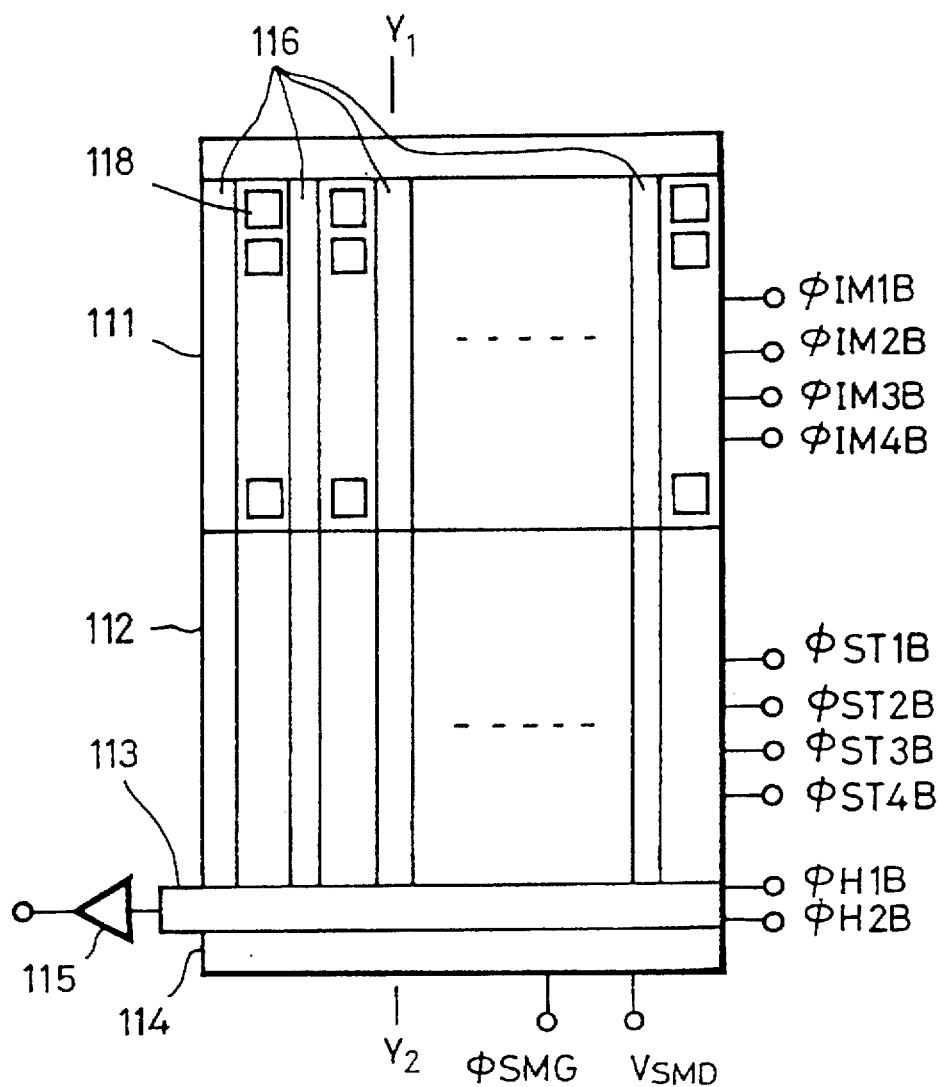
FIG. 15 is a schematic plan view showing an FIT type solid state imaging device including a solid state imaging device according to a third embodiment of the present invention.

An image sensor forming a solid state imaging device according to a third embodiment of the present invention is arranged as shown in FIG. 15.

As described before, the image sensor comprises an imaging section 111 having a sensor section 118, a storage section 112, a horizontal register 113, a smear drain section 114 and a signal charge detecting section 115. The imaging section 111 and the storage section 112 include vertical registers 116 provided at each vertical array of sensor sections 118 in the imaging section 111.

A transfer driver (not shown) which drives the vertical registers 116 is driven by 4-phase clock signals $\phi IM_{1B}$, $\phi IM_{2B}$, $\phi IM_{3B}$ and $\phi IM_{4B}$. A transfer driver (not shown) which drives the storage section 112 is similarly driven by 4-phase clock signals $\phi ST_{1B}$, $\phi ST_{2B}$, $\phi ST_{3B}$ and $\phi ST_4$. A transfer driver (not shown) that drives the horizontal register 113 is driven by clock signals $\phi H_{1B}$, and $\phi H_{2B}$.

The smear drain section 114 is supplied with a clock signal $\phi SMG$ and a DC drain voltage VSMD and whose drain section is opened and closed in response to the signal level of the clock signal $\phi SMG$.

Figure 16:
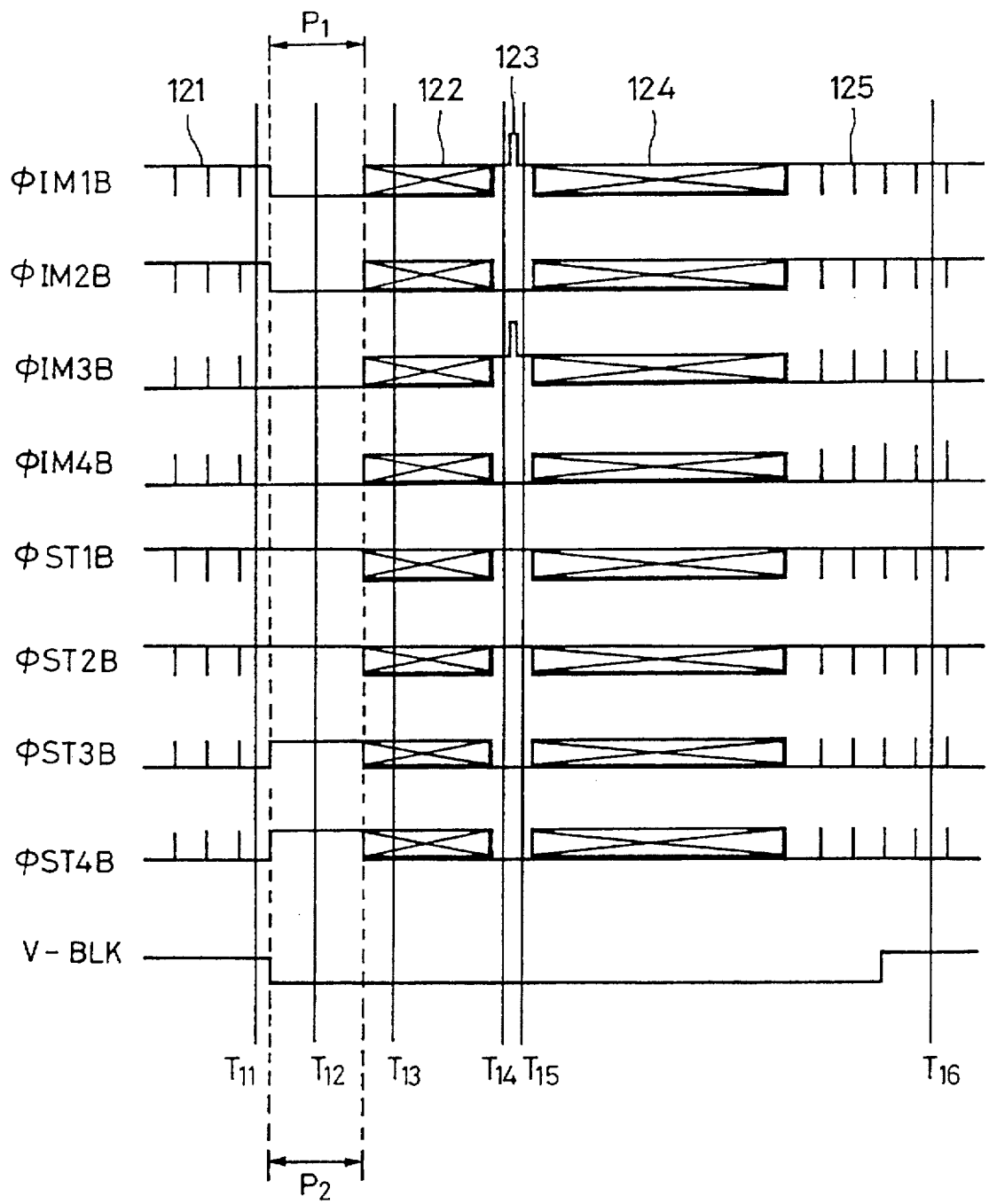
FIG. 16 is a timing chart showing examples of timing of charge transfer clocks in the solid state imaging device according to a third embodiment of the present invention.

FIG. 16 is a timing chart showing the above-mentioned clock signals $\phi IM_{1B}$ to $\phi IM_{4B}$, $\phi ST_{1B}$ to $\phi ST_{4B}$ and the vertical blanking period V-BLK. As shown in the timing chart of FIG. 16, there are provided a line shift transfer portion 121, a smear discharge transfer portion 122, a signal charge read-out portion 123, a frame shift transfer portion 124 and a line shift transfer portion 125. In addition, there are provided smear electric charge coarse discharge periods P1, P2 prior to the smear discharge transfer 122. The vertical blanking signal V-BLK controls the smear electric charge coarse discharge period P1, the smear discharge transfer 122, the signal charge read-out 123 and the frame shift transfer 124 when it is in the low level period.

As shown in FIG. 16, according to this embodiment, during the period P1, all channel portions of the vertical register 116 in the storage section 112 are held at a low level. During the period P2, all channel portions of the vertical register 116 in the imaging section 111 are held at high level. FIG. 16 shows the example that the periods P1, P2 proceed at the same time.

Figure 17:
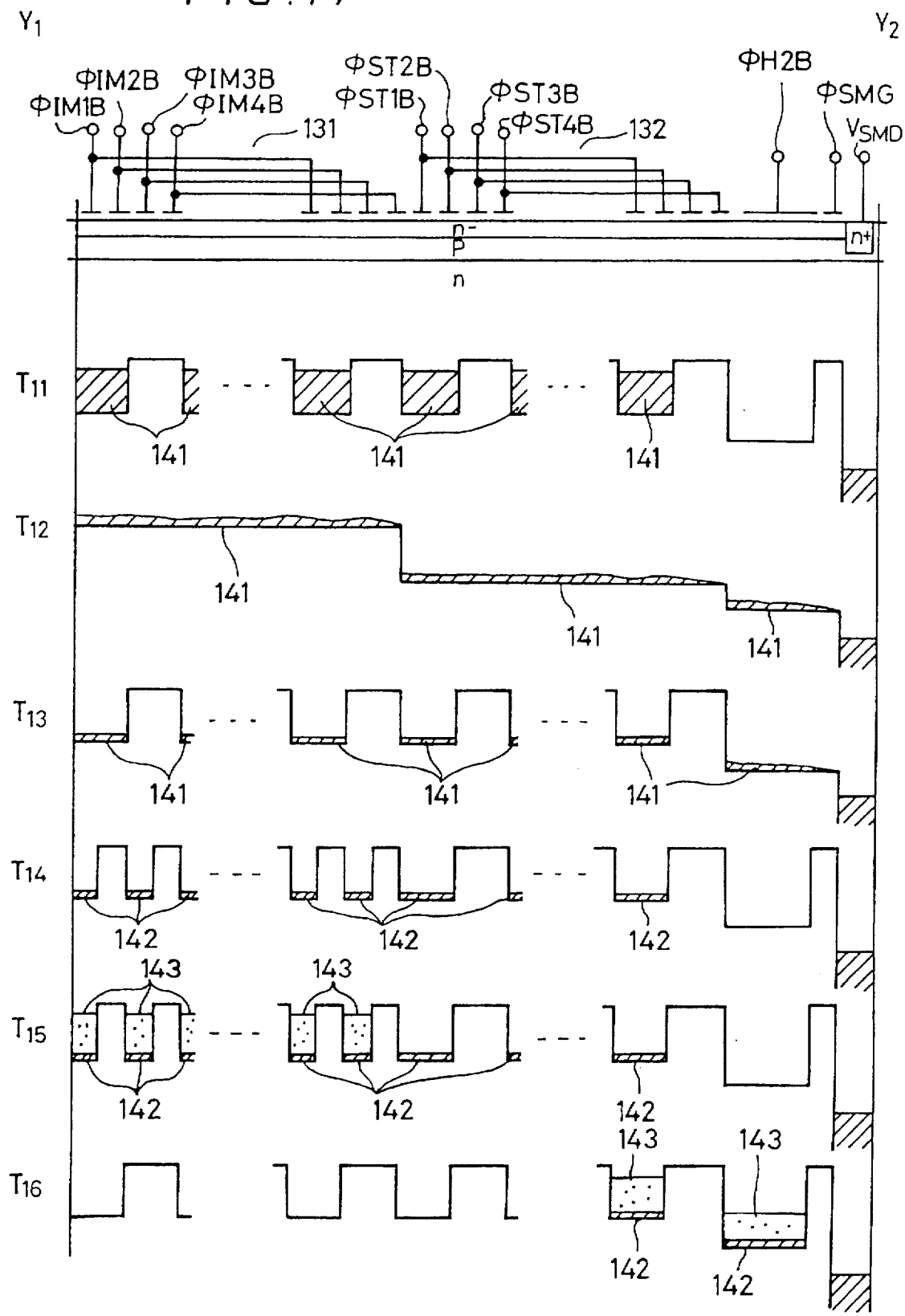
FIG. 17 is a schematic diagram showing a cross-sectional structure of the vertical register of the third embodiment of the present invention, potential levels at that portion and transferred states of smear electric charges.

FIG. 17 shows the condition that electric charges are transferred in the image sensor according to this embodiment in accordance with the timing chart of FIG. 16.

As shown in FIG. 17, at time T11, at which a line shift transfer period 121 is ending, a large quantity of smear electric charges 141, produced by an illumination of high brightness or the like, have accumulated in the vertical register 116.

At time T12, provided within the smear electric charge coarse discharge periods P1 and P2, the vertical transfer clocks $\phi IM_{1B}$ to $\phi IM_4$ and $\phi ST_{1B}$ to $\phi ST_4 B$ applied to the vertical register 116 are all held at low level in the image sensor section 111 and all held at high level in the storage section 112.

With the above-mentioned arrangement, the smear electric charge 141 can be freely moved within the channel of the vertical register 116 in accordance with the flat potential level. Since the clock signal $\phi SMG$ in the smear drain section 114 also is opened during this period, almost all of a large quantity of smear electric charges are discharged to the smear drain section 114 from the imaging section 111 through the storage section 112.

At time T13, during which the succeeding smear discharge and transfer is carried out, it is sufficient to transfer only the small quantity of smear electric charges 141 which remain within the vertical register 116. Therefore, as shown at time T13, even during the high speed discharge and transfer period 122, a driver having a large driving capability need not be provided and almost all of smear electric charges can be discharged.

Thus, at time T14, the remaining smear electric charge 142 is the result of adding any remaining electric charges after the smear discharge and transfer period 122 and new smear electric charges that are generated after the smear discharge and transfer period 122. Therefore, the amount of such electric charges is extremely small and is considerably small as compared with the amount of smear electric charges 141 provided at the first timing point $T_{11}$.

Thereafter, the read-out transfer pulse 123 causes new signal charges from the sensor sections to be carried out. At a timing point $T_{15}$, after the signal charge read-out transfer pulse 123 has ended, the smear electric charges 142 and new signal charges 143 exist within the vertical register 116 in the imaging section 111. However, the amount of the smear electric charges 142 is extremely small and cannot substantially affect the image sensor. The electric charges 142, 143 thus added are transferred through the next frame shift transfer 124 and the line shift transfer 125 to the signal charge detecting section 115 and an output of the signal charge detecting section 115 is read out as an output of the image sensor.

While the vertical transfer clocks are all held at low level in the image section 111 and are all held at high level in the storage section 112 at the timing point $T_{12}$ as described above, the present invention is not limited thereto and the following variant is also possible. Specifically, potential levels of the vertical registers 116 in the image section 111 and the storage section 112 may be made the same as each other with a similar effect being achieved.

The coarse discharge periods P1 and P2 of the image section 111 and the storage section 112, respectively, are not always made the same as each other. For example, the period P1 may be advanced in time from that of the period P2, or the duration of the period P1 may be made longer than that of the period P2. In this case, it is possible to substantially reduce a ratio of a coarse discharging time in the whole cycle by overlapping the line shift transfer and the period Pi, for example.

While there are provided the periods P1, P2 in which the potential levels of the vertical registers 116 in both the image section 111 and the storage section 112 are made flat as described above, the present invention is not limited thereto the following variant is also possible. Specifically, the potential levels may be made flat only in the image section 111 or only in one portion of the image section 111 and the line shift transfer 121 may be continued in the remaining portion and the storage section 112.

According to the solid state imaging device of this embodiment, the period P1 in which at least one portion of the potential level of the vertical register, at least in the image section, is set prior to the high speed smear discharge and transfer, to thereby move or discharge a large quantity of smear electric charges produced within the vertical register in the imaging section.

Therefore, the amount of the smear electric charges 142 is suppressed to be extremely small so that, when an object of high brightness is picked up, unlike the prior art, there is no problem that a false white smear signal will appear in the upper side of the picture on the monitor screen to deteriorate the quality of the picture reproduced on the monitor screen.

Figure 18:
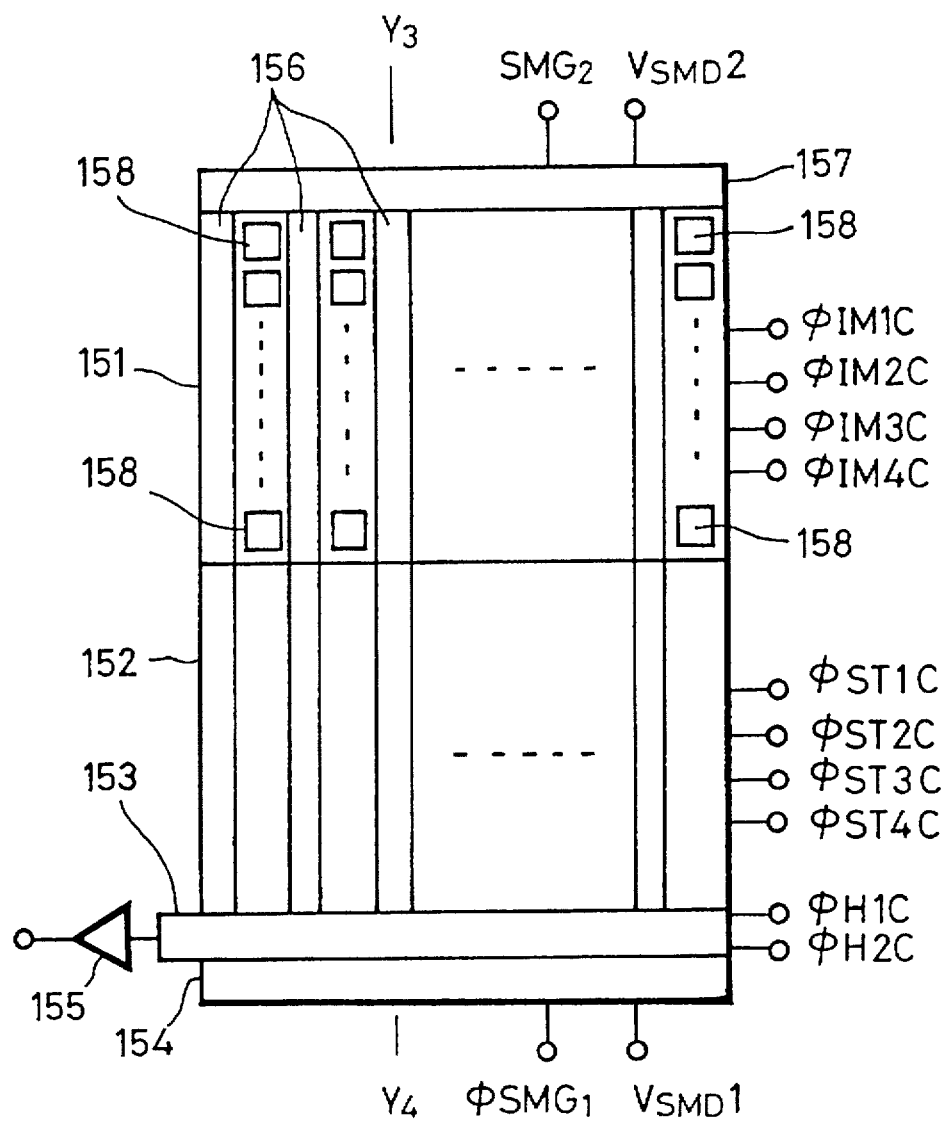
FIG. 18 is a plan view similar to FIG. 15 showing a solid state imaging device according to a fourth embodiment of the present invention.

FIG. 18 is a schematic plan view of the image sensor according to a fourth embodiment of the present invention. The layout shown in FIG. 18 is different from that of the image sensor shown in FIG. 15 in that there is provided a first smear drain section 154 corresponding to the smear drain section 114 of the preceding embodiment and that a second smear drain section 157 is disposed adjacent to the end portion of a vertical register 156 in an image section 151. In FIG. 18, reference numeral 152 depicts a storage section, 153 depicts a horizontal shift register, 155 depicts a signal charge detecting section and 158 depicts a sensor section (sensor pixel).

Figure 19:
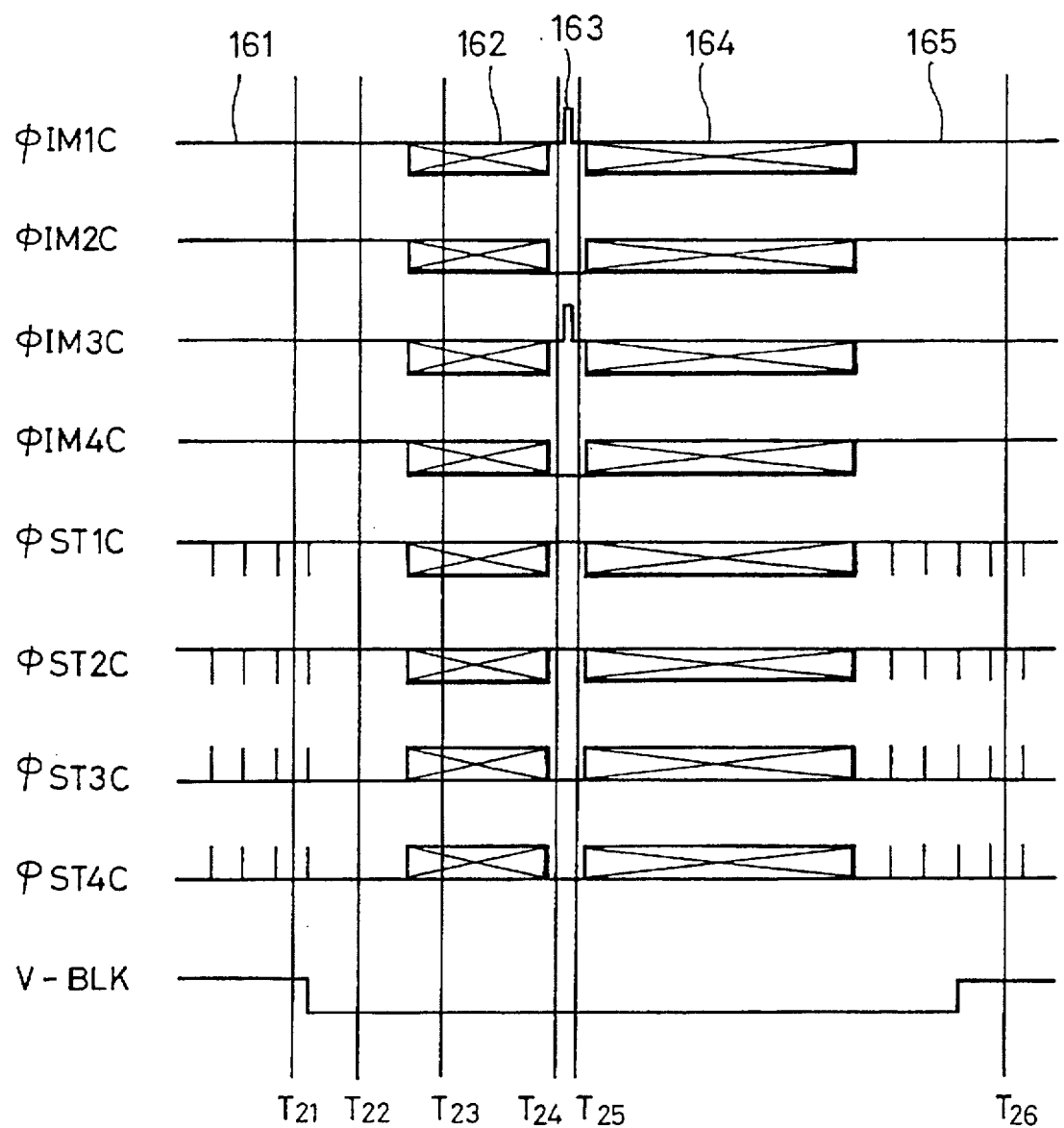
FIG. 19 is a timing chart similar to FIG. 16 to which reference will be made in explaining operation of the solid state imaging device shown in FIG. 18.
Figure 20:
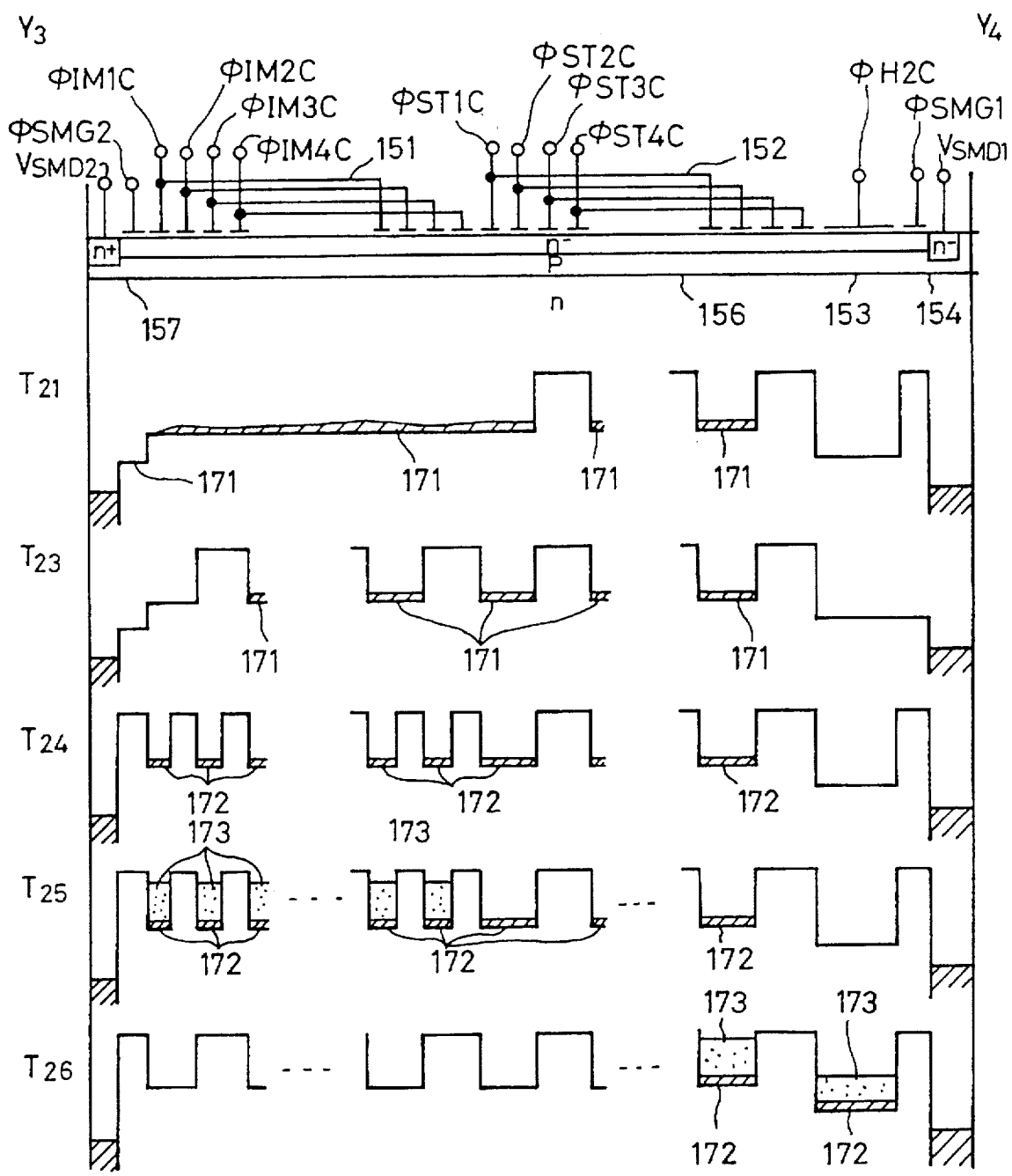
FIG. 20 is a diagram similar to FIG. 17 to which reference will be made in explaining operation of the solid state imaging device shown in FIG. 18.

FIG. 19 is a timing chart of respective clocks which drive the vertical registers in this image sensor and the vertical blanking signal V-BLK. FIG. 20 shows a schematic structure of sensor taken along the line Y3–Y4 in FIG. 18 and potential levels at that portion and the electric charge transferred states, similarly to FIG. 17.

According to the fourth embodiment of the present invention, during a period of a line shift transfer 161, transfer clocks $\phi IM_{1C}$ to $\phi IM_{4C}$ of the vertical registers 156 in the image section 151 are all maintained at high level. The levels of these transfer clocks $\phi IM_{1C}$ to $\phi IM_{4C}$ are not always limited to a high level and it is sufficient that they are maintained at constant level. Also, the potential of the vertical registers 156 in the image section 151 need not be maintained at a constant level over the whole period of the line shift transfer 161, and it is sufficient that the line shift transfer 161 be maintained at constant level during a predetermined period prior to the smear discharge and transfer 162.

As shown in FIG. 20, at a timing $T_{21}$ immediately before the line shift transfer 161 is ended, smear electric charges 171 produced in the vertical register 156 in the image section 151 are constantly discharged to the second smear drain section 157 by holding all of the vertical clocks of the image section 151 at the same constant voltage. This processing is carried out during the line shift transfer 161.

A smear discharge and transfer 162 is carried out after the line shift transfer 161. At a timing point $T_{22}$, the line shift transfer is ended and the potential levels of both the vertical transfer sections are made flat prior to the smear discharge and transfer 162. Smear electric charges generated during the smear discharge and transfer period 162 are all sequentially discharged to the first smear drain side. A timing point $T_{23}$ in FIG. 20 shows such condition. The transferred states after the timing point $T_{23}$ are similar to those provided after the timing point $T_{13}$ in the preceding embodiment and therefore need not be described in detail.

According to this embodiment, since the smear electric charge coarse discharge period is sufficiently long, the coarse discharge capability of the smear electric charge can be increased considerably as compared with that of the preceding embodiments.

Since the quantity of smear electric charges remaining in the vertical registers in the image section when new signal charges are read out after the discharge and transfer was ended is extremely small as described above, the level of the smear false signal caused by the smear electric charges can be suppressed to be small.

In the conventional image sensor, it has been customary to use a bipolar transistor of high driving capability to discharge a large quantity of smear electric charges rapidly as a transfer driver for driving the vertical register. However, in the case of the aforesaid embodiments, since the quantity of smear electric charges to be discharged by transferring is small, the bipolar transistor type driver may be replaced with a CMOS (complementary metal oxide semiconductor) type driver, which can therefore reduce the power consumption considerably.

As described above, according to the solid state imaging device of the present invention, since the coarse discharge of smear electric charges is carried out by the application of the clock voltage at the vertical gate so that the potential levels of at least one portion of the vertical register are made flat, the smear electric charges can be reliably discharged and transferred substantially completely even by a small transfer driving force.

Therefore, even when an object of high brightness is picked up, the level of the smear false signal generated in the output of the solid state imaging device can be suppressed to be small and an image signal of high quality can be transmitted. Also, it is possible to reduce power consumption.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A solid state imaging device comprising:
    an imaging section comprising a plurality of sensor sections arrayed in horizontal and vertical directions, and a first vertical transfer section disposed between each vertical array of sensor sections for sequentially transferring, in the vertical direction, signal charges read out from each said sensor sections by movement of potential wells;
    a storage section for temporarily storing said signal charges, said storage section comprising second vertical transfer sections disposed to receive signal charges transferred from said first vertical transfer sections by movement of said potential wells;
    a horizontal transfer section for reading signal charges transferred thereto from said second vertical transfer sections at a predetermined timing and for transferring said signal charges in the horizontal direction;
    a signal read-out section for reading signal charges sequentially transferred from said horizontal transfer section;
    a smear drain section for discharging excess electric charges from said first and second vertical transfer sections; and
    means for applying clock pulses to said first and second vertical transfer sections, said clock pulses including a coarse discharge period followed by an excess charge discharge transfer period;
    wherein a potential level of at least one of said first and second vertical transfer sections is held at a constant level in the transfer direction by the application of a vertical gate clock pulse during said coarse discharge period; and
    wherein during said coarse discharge period the potential level of said first vertical transfer sections are fixed at a low level and during said excess charge discharge transfer period the potential level of said second vertical transfer sections are fixed at a high level.

2. A solid state imaging device according to claim 1, wherein the time periods during which the potential levels of the first and second vertical transfer sections are held at a constant level in the direction of charge transfer are different.

3. A solid state imaging device according to claim 1, wherein the potential level of said first vertical transfer section is held constant during said coarse discharge period.

4. A solid state imaging device comprising:
    an imaging section comprising a plurality of sensor sections arrayed in horizontal and vertical directions, and a first vertical transfer section disposed between each vertical array of sensor sections for sequentially transferring, in the vertical direction, signal charges read out from each said sensor sections by movement of potential wells;
    a storage section for temporarily storing said signal charges, said storage section comprising second vertical transfer sections disposed to receive signal charges transferred from said first vertical transfer sections by movement of said potential wells;
    a horizontal transfer section for reading signal charges transferred thereto from said second vertical transfer sections at a predetermined timing and for transferring said signal charges in the horizontal direction;
    a signal read-out section for reading signal charges sequentially transferred from said horizontal transfer section;
    a smear drain section for discharging excess electric charges from said first and second vertical transfer sections; and
    means for applying clock pulses to said first and second vertical transfer sections, said clock pulses including a coarse discharge period followed by an excess charge discharge transfer period;
    wherein a potential level of at least one of said first and second vertical transfer sections is held at a constant level in the transfer direction by the application of a vertical gate clock pulse during said coarse discharge period; and
    wherein during said coarse discharge period the potential level of said first vertical transfer section is fixed at a low level and the Potential level of said second vertical transfer section is fixed at a high level.

5. A solid state imaging device according to claim 4, wherein the time periods during which the potential levels of the first and second vertical transfer sections are held at a constant level in the direction of charge transfer are different.

6. A solid state imaging device according to claim 4, wherein the potential level of said first vertical transfer section is held constant during said coarse discharge period.

7. A solid state imaging device, comprising:
    an imaging section comprising a plurality of sensor sections arranged in a horizontal and vertical array and first vertical transfer sections disposed adjacent each vertical array of sensor sections for sequentially transferring, by movement of potential wells in the vertical direction, signal charges read out from each of said sensor sections, said vertical transfer sections having respective first and second end portions;
    a storage section having second vertical transfer sections disposed to receive signal charges transferred from said first vertical transfer sections by movement of said potential wells and for temporarily storing said signal charges, said second vertical transfer sections having respective first and second end portions wherein each second end portion of each of said first vertical transfer sections abuts a first end portion of a corresponding one of said second vertical transfer sections;
    a horizontal transfer section for reading signal charges transferred thereto from said second vertical transfer sections at a predetermined timing and for transferring said signal charges in the horizontal direction;
    a signal read-out section for reading signal charges sequentially transferred from said horizontal transfer section;
    a first smear drain section disposed proximate to each first end portion of each of said first vertical transfer section, said first smear drain sections discharging excess electric charges from said first vertical transfer section; and
    a second smear drain section disposed proximate to each second end portion of each of said second vertical transfer section, said first smear drain sections discharging excess electric charges from said first and second vertical transfer sections;
    means for applying clock pulses to said first and second vertical transfer sections, said clock pulses defining a coarse discharge period followed by a discharge and transfer period and wherein a potential level of at least one of said first and second vertical transfer sections is held flat in the transfer direction during said coarse discharge period; and wherein during said coarse discharge period the means for applying clock pulses is operable to hold the potential level of said first vertical transfer section at a low level and the potential of said second vertical transfer section at a high level.

8. A solid state imaging device according to claim 7, wherein during the coarse discharge period the potential level of said first vertical transfer section is maintained at a constant level.

9. A solid state imaging device according to claim 7, wherein said excess electric charges are discharged to said first smear drain section during said coarse discharge period and wherein during said discharge and transfer period said first and second vertical transfer sections discharge said excess electric charges to said second smear drain section.

10. A solid state imaging device, comprising:

an imaging section comprising a plurality of sensor sections arranged in a horizontal and vertical array and first vertical transfer sections disposed adjacent each vertical array of sensor sections for sequentially transferring, by movement of potential wells in the vertical direction, signal charges read out from each of said sensor sections, said vertical transfer sections having respective first and second end portions;

a storage section having second vertical transfer sections disposed to receive signal charges transferred from said first vertical transfer sections by movement of said potential wells and for temporarily storing said signal charges, said second vertical transfer sections having respective first and second end portions wherein each second end portion of each of said first vertical transfer sections abuts a first end portion of a corresponding one of said second vertical transfer sections;

a horizontal transfer section for reading signal charges transferred thereto from said second vertical transfer sections at a predetermined timing and for transferring said signal charges in the horizontal direction;

a signal read-out section for reading signal charges sequentially transferred from said horizontal transfer section;

a first smear drain section disposed proximate to each first end portion of each of said first vertical transfer section, said first smear drain sections discharging excess electric charges from said first vertical transfer section; and a second smear drain section disposed proximate to each second end portion of each of said second vertical transfer section, said first smear drain sections discharging excess electric charges from said first and second vertical transfer sections;

means for applying clock pulses to said first and second vertical transfer sections, said clock pulses defining a coarse discharge period followed by a discharge and transfer period and wherein a potential level of at least one of said first and second vertical transfer sections is held flat in the transfer direction during said coarse discharge period; and wherein during said coarse discharge period the means for applying clock pulses is operable to hold the respective potential levels of said first and second vertical transfer sections at the same level.

11. A solid state imaging device according to claim 10, wherein during the coarse discharge period the potential level of said first vertical transfer section is maintained at a constant level.

12. A solid state imaging device according to claim 10, wherein said excess electric charges are discharged to said first smear drain section during said coarse discharge period and wherein during said discharge and transfer period said first and second vertical transfer sections discharge said excess electric charges to said second smear drain section.

13. A solid state imaging device, comprising:

an imaging section comprising a plurality of sensor sections arranged in a horizontal and vertical array and first vertical transfer sections disposed adjacent each vertical array of sensor sections for sequentially transferring, by movement of potential wells in the vertical direction, signal charges read out from each of said sensor sections, said vertical transfer sections having respective first and second end portions;

a storage section having second vertical transfer sections disposed to receive signal charges transferred from said first vertical transfer sections by movement of said potential wells and for temporarily storing said signal charges, said second vertical transfer sections having respective first and second end portions wherein each second end portion of each of said first vertical transfer sections abuts a first end portion of a corresponding one of said second vertical transfer sections;

a horizontal transfer section for reading signal charges transferred thereto from said second vertical transfer sections at a predetermined timing and for transferring said signal charges in the horizontal direction;

a signal read-out section for reading signal charges sequentially transferred from said horizontal transfer section;

a first smear drain section disposed proximate to each first end portion of each of said first vertical transfer section, said first smear drain sections discharging excess electric charges from said first vertical transfer section; and a second smear drain section disposed proximate to each second end portion of each of said second vertical transfer section, said first smear drain sections discharging excess electric charges from said first and second vertical transfer sections;

means for applying clock pulses to said first and second vertical transfer sections, said clock pulses defining a coarse discharge period followed by a discharge and transfer period and wherein a potential level of at least one of said first and second vertical transfer sections is held flat in the transfer direction during said coarse discharge period; and wherein the time periods during which the potential levels of said first and second vertical transfer sections are held so as to transfer charges are different from each other.

14. A solid state imaging device according to claim 13, wherein during the coarse discharge period the potential level of said first vertical transfer section is maintained at a constant level.

15. A solid state imaging device according to claim 13, wherein said excess electric charges are discharged to said first smear drain section during said coarse discharge period and wherein during said discharge and transfer period said first and second vertical transfer sections discharge said excess electric charges to said second smear drain section.

16. A reduced power consumption method of driving a solid state imaging device, said solid state imaging device including:

an imaging section having sensors for converting incident light into a signal charge and a first vertical transfer register for transferring said signal charge, said first vertical transfer register being provided with a first plurality of electrodes through which either a high potential state or a low potential state is applied in accordance with a first multi-phase clock signal, a storage section for temporarily storing the signal charge from said imaging section prior to transferring said signal charge to a horizontal transfer register, said storage section including a second vertical transfer register for transferring the signal charge from said imaging section, said second vertical transfer register being provided with a second plurality of electrodes through which either a high potential state or a low potential state is applied in accordance with a second multi-phase clock signal, and a drain region coupled to said storage section through a gate region;

said method of driving comprising: accumulating the signal charge with said sensors during a first period; transferring the signal charge from said imaging section to said storage section by applying a transfer pulse to said first plurality of electrodes and said second plurality of electrodes during a second period; and transferring the signal charge from said storage section to said horizontal transfer register;

wherein in a third period, a transfer clock pulse is applied to said first plurality of electrodes and the potential of said second vertical transfer register is maintained at said high potential state to thereby discharge and transfer excess electric charges from the imaging section to the storage section from which the excess electric charge is discharged through said gate section to said drain section.

17. A method of driving a solid state imaging device according to claim 16, wherein the potential within said second vertical transfer register is held constant at said high potential state while said first multi-phase clock signal continues to alternate between said high and low potential states.

* * * * *